(12) United States Patent
Zhu et al.

(10) Patent No.: US 11,277,332 B2
(45) Date of Patent: Mar. 15, 2022

(54) DUAL PRIORITY BEARERS FOR VIDEO TRANSMISSION

(71) Applicant: Qualcomm Incorporated, San Diego, CA (US)

(72) Inventors: Xipeng Zhu, San Diego, CA (US); Ruiming Zheng, Beijing (CN); Rulin Xing, Beijing (CN); Huichun Liu, Beijing (CN); Thomas Stockhammer, Bergen (DE); Stefano Faccin, San Ysidro, CA (US); Kuo-Chun Lee, San Diego, CA (US); Feilu Liu, San Diego, CA (US); Yu-Ting Yu, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 16/333,500

(22) PCT Filed: Apr. 20, 2017

(86) PCT No.: PCT/CN2017/081219
§ 371 (c)(1),
(2) Date: Mar. 14, 2019

(87) PCT Pub. No.: WO2018/082267
PCT Pub. Date: May 11, 2018

(65) Prior Publication Data
US 2019/0260669 A1    Aug. 22, 2019

(30) Foreign Application Priority Data

Nov. 3, 2016  (CN) .................. PCT/CN2016/104459

(51) Int. Cl.
*H04L 12/707* (2013.01)
*H04W 76/15* (2018.01)
(Continued)

(52) U.S. Cl.
CPC ............ *H04L 45/22* (2013.01); *H04L 47/193* (2013.01); *H04W 28/0252* (2013.01);
(Continued)

(58) Field of Classification Search
CPC ......... H04W 28/0252; H04W 28/0268; H04W 28/0263; H04W 76/15; H04W 88/02; H04L 45/22; H04L 47/193
See application file for complete search history.

(56) References Cited

U.S. PATENT DOCUMENTS 9,474,054 B1   10/2016 Pawar et al.
10,250,491 B2   4/2019 Lee et al.
(Continued)

FOREIGN PATENT DOCUMENTS

CN      1964564 A   5/2007
CN    101365159 A   2/2009
(Continued)

OTHER PUBLICATIONS

International Search Report and Written Opinion—PCT/CN2017/081219—ISA/EPO—dated Jul. 21, 2017.
(Continued)

*Primary Examiner* — Elton Williams
(74) *Attorney, Agent, or Firm* — Holland & Hart LLP

(57) ABSTRACT

A user equipment (UE) may identify a bearer (e.g., a default bearer) and request establishment of a second bearer (e.g., a high priority bearer) for use in streaming downlink data from, for example, an application server. The UE may determine a status of a playout buffer and select the first bearer or the second bearer for use in streaming the downlink data associated with the application based on the status of the playout buffer. For example, the first bearer may be used be used by default, and the second bearer may be selected if the amount of data in the playout buffer does not
(Continued)

satisfy (e.g., is below) a threshold. In some cases, each bearer may be associated with a transmission control protocol (TCP) port associated with a TCP connection. In some cases, each bearer may be associated with different Internet protocol (IP) address.

30 Claims, 13 Drawing Sheets

(51) Int. Cl.
*H04L 12/801* (2013.01)
*H04W 28/02* (2009.01)
*H04W 88/02* (2009.01)
*H04L 45/00* (2022.01)
*H04L 47/193* (2022.01)

(52) U.S. Cl.
CPC ... *H04W 28/0263* (2013.01); *H04W 28/0268* (2013.01); *H04W 76/15* (2018.02); *H04W 88/02* (2013.01)

(56) References Cited

U.S. PATENT DOCUMENTS

| | | | |
|---|---|---|---|
| 2012/0008559 A1 | 1/2012 | Leung et al. | |
| 2012/0036541 A1* | 2/2012 | Kotecha | H04L 41/50 725/62 |
| 2012/0093113 A1* | 4/2012 | Zhu | H04W 76/10 370/329 |
| 2014/0056243 A1 | 2/2014 | Pelletier et al. | |
| 2014/0105011 A1* | 4/2014 | Chandramouli | H04W 4/08 370/230 |
| 2014/0105125 A1* | 4/2014 | Chaponniere | H04W 76/32 370/329 |
| 2014/0204950 A1* | 7/2014 | Willars | H04L 61/35 370/392 |
| 2014/0321378 A1* | 10/2014 | Zhang | H04W 4/18 370/329 |
| 2016/0112239 A1* | 4/2016 | Kanugovi | H04W 88/16 370/338 |
| 2018/0270703 A1* | 9/2018 | Kodali | H04W 28/0278 |

FOREIGN PATENT DOCUMENTS

| | | |
|---|---|---|
| CN | 101772090 A | 7/2010 |
| CN | 104365145 A | 2/2015 |
| GB | 2523534 A | 9/2015 |
| WO | WO-2016107654 A1 | 7/2016 |
| WO | WO 2016119199 A1 | 8/2016 |
| WO | WO-2017196452 A1 | 11/2017 |

OTHER PUBLICATIONS

International Search Report and Written Opinion—PCT/CN2016/104459—ISA/EPO—dated Jul. 21, 2017.
Supplementary European Search Report—EP17867610—Search Authority—Berlin—dated May 12, 2020.

* cited by examiner

DUAL PRIORITY BEARERS FOR VIDEO TRANSMISSION

CROSS REFERENCES

The present 371 Application for Patent claims priority to PCT Patent Application No. PCT/CN2017/081219 by Zhu et al., entitled "DUAL PRIORITY BEARERS FOR VIDEO TRANSMISSION", filed Apr. 20, 2017, and to PCT Patent Application No. PCT/CN2016/104459 by Zhu, et al., entitled "PLURAL BEARERS FOR AN APPLICATION," filed Nov. 3, 2016, each of which is assigned to the assignee hereof.

BACKGROUND

The following relates generally to wireless communication, and more specifically to dual bearer application data streaming.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may support UE data streaming (e.g., associated with an application) over the Internet. Over-the-top (OTT) content may be exchanged in the same way as regular Internet traffic, which, for some data (e.g., video), may result in reduced throughput, or latency (e.g., video stalling). Improved methods of communication between the base station and the UE are desired.

SUMMARY

The described techniques relate to improved methods, systems, devices, or apparatuses that support dual bearer application data streaming. A user equipment (UE) may identify a bearer (e.g., a default bearer) and request establishment of a second bearer (e.g., a high priority bearer) for use in streaming downlink data from, for example, an application server. The UE may determine a status of a playout buffer and select the first bearer or the second bearer for use in streaming the downlink data associated with the application based on the status of the playout buffer. For example, the first bearer may be used by default or in circumstances when the amount of data in a playout buffer satisfies (e.g., is above) a threshold, and the second bearer may be selected if the amount of data in the playout buffer does not satisfy (e.g., is below) the threshold. In some cases, each bearer may be associated with a transmission control protocol (TCP) port associated with a TCP connection. In some cases, each bearer may be associated with different Internet protocol (IP) addresses.

A method of wireless communication is described. The method may include identifying, at a UE, a first bearer for use in streaming downlink data associated with an application, requesting, at the UE, establishment of at least a second bearer for use in streaming the downlink data associated with the application, determining a status of a playout buffer of the UE, and selecting, based at least in part on the status of the playout buffer, the first bearer or the second bearer for use in streaming the downlink data associated with the application.

An apparatus for wireless communication is described. The apparatus may include means for identifying, at a UE, a first bearer for use in streaming downlink data associated with an application, means for requesting, at the UE, establishment of at least a second bearer for use in streaming the downlink data associated with the application, means for determining a status of a playout buffer of the UE, and means for selecting, based at least in part on the status of the playout buffer, the first bearer or the second bearer for use in streaming the downlink data associated with the application.

Another apparatus for wireless communication is described. The apparatus may include a processor, memory in electronic communication with the processor, and instructions stored in the memory. The instructions may be operable to cause the processor to identify, at a UE, a first bearer for use in streaming downlink data associated with an application, request, at the UE, establishment of at least a second bearer for use in streaming the downlink data associated with the application, determine a status of a playout buffer of the UE, and select, based at least in part on the status of the playout buffer, the first bearer or the second bearer for use in streaming the downlink data associated with the application.

A non-transitory computer readable medium for wireless communication is described. The non-transitory computer-readable medium may include instructions operable to cause a processor to identify, at a UE, a first bearer for use in streaming downlink data associated with an application, request, at the UE, establishment of at least a second bearer for use in streaming the downlink data associated with the application, determine a status of a playout buffer of the UE, and select, based at least in part on the status of the playout buffer, the first bearer or the second bearer for use in streaming the downlink data associated with the application.

In some examples of the method, apparatus, and non-transitory computer-readable medium described above, selecting the first bearer or the second bearer comprises selecting the first bearer based at least in part on an amount of data in the playout buffer satisfying a threshold. Some examples of the method, apparatus, and non-transitory computer-readable medium described above may further include processes, features, means, or instructions for selecting the second bearer based at least in part on the amount of data in the playout buffer not satisfying the threshold.

Some examples of the method, apparatus, and non-transitory computer-readable medium described above may further include processes, features, means, or instructions for using a first TCP port associated with a first TCP connection at the UE for communication on the first bearer. Some examples of the method, apparatus, and non-transitory computer-readable medium described above may further include processes, features, means, or instructions for using a second TCP port associated with a second TCP connection at the UE for communication on the second bearer.

Some examples of the method, apparatus, and non-transitory computer-readable medium described above may further include processes, features, means, or instructions for using a first IP address associated with the UE for communication on the first bearer. Some examples of the method, apparatus, and non-transitory computer-readable medium described above may further include processes, features, means, or instructions for using a second IP address associated with the UE for communication on the second bearer.

In some examples of the method, apparatus, and non-transitory computer-readable medium described above, selecting the first bearer or the second bearer further comprises selecting the first bearer or the second bearer based on a network or operator-imposed incentive.

In some examples of the method, apparatus, and non-transitory computer-readable medium described above, requesting establishment of at least the second bearer comprises establishing a first TCP connection using the first bearer. Some examples of the method, apparatus, and non-transitory computer-readable medium described above may further include processes, features, means, or instructions for establishing a second TCP connection using the first bearer. Some examples of the method, apparatus, and non-transitory computer-readable medium described above may further include processes, features, means, or instructions for requesting, using one or more parameters of the second TCP connection, establishment of the second bearer.

In some examples of the method, apparatus, and non-transitory computer-readable medium described above, requesting establishment of the second bearer comprises using an application programming interface (API) provided by at least one of a modem of the UE or a high level operating system (HLOS) of the UE to request establishment of the second bearer based at least on a traffic flow template (TFT) filter.

In some examples of the method, apparatus, and non-transitory computer-readable medium described above, the TFT filter may be based on a 5-tuple of the second TCP connection.

In some examples of the method, apparatus, and non-transitory computer-readable medium described above, requesting establishment of at least the second bearer comprises initiating a first packet data network (PDN) connection and a second PDN connection via an API provided by at least one of a modem of the UE or a HLOS of the UE. Some examples of the method, apparatus, and non-transitory computer-readable medium described above may further include processes, features, means, or instructions for establishing a first TCP connection using the first PDN connection. Some examples of the method, apparatus, and non-transitory computer-readable medium described above may further include processes, features, means, or instructions for establishing a second TCP connection using the second PDN connection. Some examples of the method, apparatus, and non-transitory computer-readable medium described above may further include processes, features, means, or instructions for requesting, using one or more parameters of the second TCP connection, establishment of the second bearer.

In some examples of the method, apparatus, and non-transitory computer-readable medium described above, selecting the first bearer or the second bearer comprises determining that an HLOS of the UE lacks support for dual IP bearer establishment. Some examples of the method, apparatus, and non-transitory computer-readable medium described above may further include processes, features, means, or instructions for using a first IP address associated with the UE for communication on the first bearer. Some examples of the method, apparatus, and non-transitory computer-readable medium described above may further include processes, features, means, or instructions for using a second IP address associated with the UE for communication on the second bearer.

Some examples of the method, apparatus, and non-transitory computer-readable medium described above may further include processes, features, means, or instructions for mapping a first TCP port to the first IP address. Some examples of the method, apparatus, and non-transitory computer-readable medium described above may further include processes, features, means, or instructions for mapping a second TCP port to the second IP address using network address translation (NAT).

In some examples of the method, apparatus, and non-transitory computer-readable medium described above, selecting the first bearer or the second bearer comprises determining that an amount of data in the playout buffer does not satisfy a threshold. Some examples of the method, apparatus, and non-transitory computer-readable medium described above may further include processes, features, means, or instructions for sending a video request via a second TCP connection over the second bearer, wherein the second bearer may be a priority bearer.

In some examples of the method, apparatus, and non-transitory computer-readable medium described above, selecting the first bearer or the second bearer comprises determining that an amount of data in the playout buffer satisfies a threshold. Some examples of the method, apparatus, and non-transitory computer-readable medium described above may further include processes, features, means, or instructions for sending a video request via a first TCP connection over the first bearer, wherein the second bearer may be a priority bearer having a priority that may be greater than that of the first bearer.

In some examples of the method, apparatus, and non-transitory computer-readable medium described above, selecting the first bearer or the second bearer further comprises selecting the first bearer or the second bearer based on a monetary cost associated with use of the second bearer.

In some examples of the method, apparatus, and non-transitory computer-readable medium described above, selecting the first bearer or the second bearer further comprises selecting the first bearer or the second bearer based on a quota associated with use of the second bearer.

In some examples of the method, apparatus, and non-transitory computer-readable medium described above, the quota may be a percentage of requests for use of the second bearer. In some examples of the method, apparatus, and non-transitory computer-readable medium described above, the first bearer comprises a default bearer and the second bearer comprises a dedicated bearer having a priority that may be greater than that of the default bearer.

In some examples of the method, apparatus, and non-transitory computer-readable medium described above, the first bearer and the second bearer each comprise at least one of a radio bearer, a core network bearer, or an evolved packet system (EPS) bearer.

In some examples of the method, apparatus, and non-transitory computer-readable medium described above, the downlink data associated with the application comprises video data.

In some examples of the method, apparatus, and non-transitory computer-readable medium described above, the downlink data associated with the application comprises priority data.

Some examples of the method, apparatus, and non-transitory computer-readable medium described above may further include processes, features, means, or instructions for requesting, at the UE, establishment of at least the second bearer for use in streaming the downlink data includes requesting, by an application client at the UE, establishment of at least the second bearer for use in streaming the downlink data.

In some examples of the method, apparatus, and non-transitory computer-readable medium described above, the first bearer comprises an EPS bearer. In some examples of the method, apparatus, and non-transitory computer-readable medium described above, the second bearer comprises an EPS bearer. In some examples of the method, apparatus, and non-transitory computer-readable medium described above, an EPS bearer may be a combination of a bearer between the UE and a base station, a bearer between the base station and a serving gateway, and a bearer between the serving gateway and a packet data network gateway.

Some examples of the method, apparatus, and non-transitory computer-readable medium described above may further include processes, features, means, or instructions for associating a first TCP connection with the first bearer and a second TCP connection with the second bearer by an application client of the UE.

In some examples of the method, apparatus, and non-transitory computer-readable medium described above, the first TCP connection may be associated with a first TCP port and a first IP address. In some examples of the method, apparatus, and non-transitory computer-readable medium described above, the second TCP connection may be associated with a second TCP port and the first IP address.

In some examples of the method, apparatus, and non-transitory computer-readable medium described above, the first TCP connection may be associated with a first TCP port and a first IP address. In some examples of the method, apparatus, and non-transitory computer-readable medium described above, the second TCP connection may be associated with a second TCP port and a second IP address.

DETAILED DESCRIPTION

A user equipment (UE) may include a number of different applications or application clients that may operate on the UE. In some instances, an application or application client may request that data be streamed to the UE. For example, a video client may communicate with a video server so as to request a downlink video stream. Other types of data streaming may also be requested. Data streaming may sometimes be referred to as over-the-top (OTT) streaming or content. OTT content may be exchanged in the same way as regular Internet traffic, which, for some data (e.g., video), may result in reduced throughput or latency (e.g., video stalling).

A UE may support dual bearer establishment for use in streaming downlink data from, for example, an application server. Dual bearer application data streaming may refer to use of higher priority bearers (e.g., associated with a higher Quality of Service (QoS)) to reduce and/or circumvent latency that may arise from use of a single bearer for multiple Internet services. Thus, in some cases, a UE that includes an application client that is requesting a downlink data stream may request establishment of additional bearers. For example, a UE may identify a first or default bearer and may request establishment of a second, high priority bearer. The two established bearers may be associated with a different QoS.

In some cases, the UE may select one of the established bearers for use in streaming downlink data associated with an application based on the status of a playout buffer. For example, a normal priority bearer may be used by default, and a high priority bearer may be selected if the amount of data in the playout buffer is below a threshold. According to aspects of the disclosure, each bearer may be associated with a transmission control protocol (TCP) port associated with a TCP connection. Additionally, each bearer may be associated with different Internet protocol (IP) address An application based solution for dynamically determining transmission priority may reduce latency and/or mitigate negative effects associated with cell capacity within a wireless communications system. Such a solution may generally apply to transmissions requiring dynamic or conditional priority control (e.g., video transmissions, mission critical applications, etc.).

Aspects of the disclosure are initially described in the context of a wireless communications system. Examples of wireless systems supporting dual bearer application data streaming in addition to process flows for establishing dual priority bearers are then described. Aspects of the disclosure are further illustrated by and described with reference to apparatus diagrams, system diagrams, and flowcharts that relate to dual bearer application data streaming.

Figure 1:
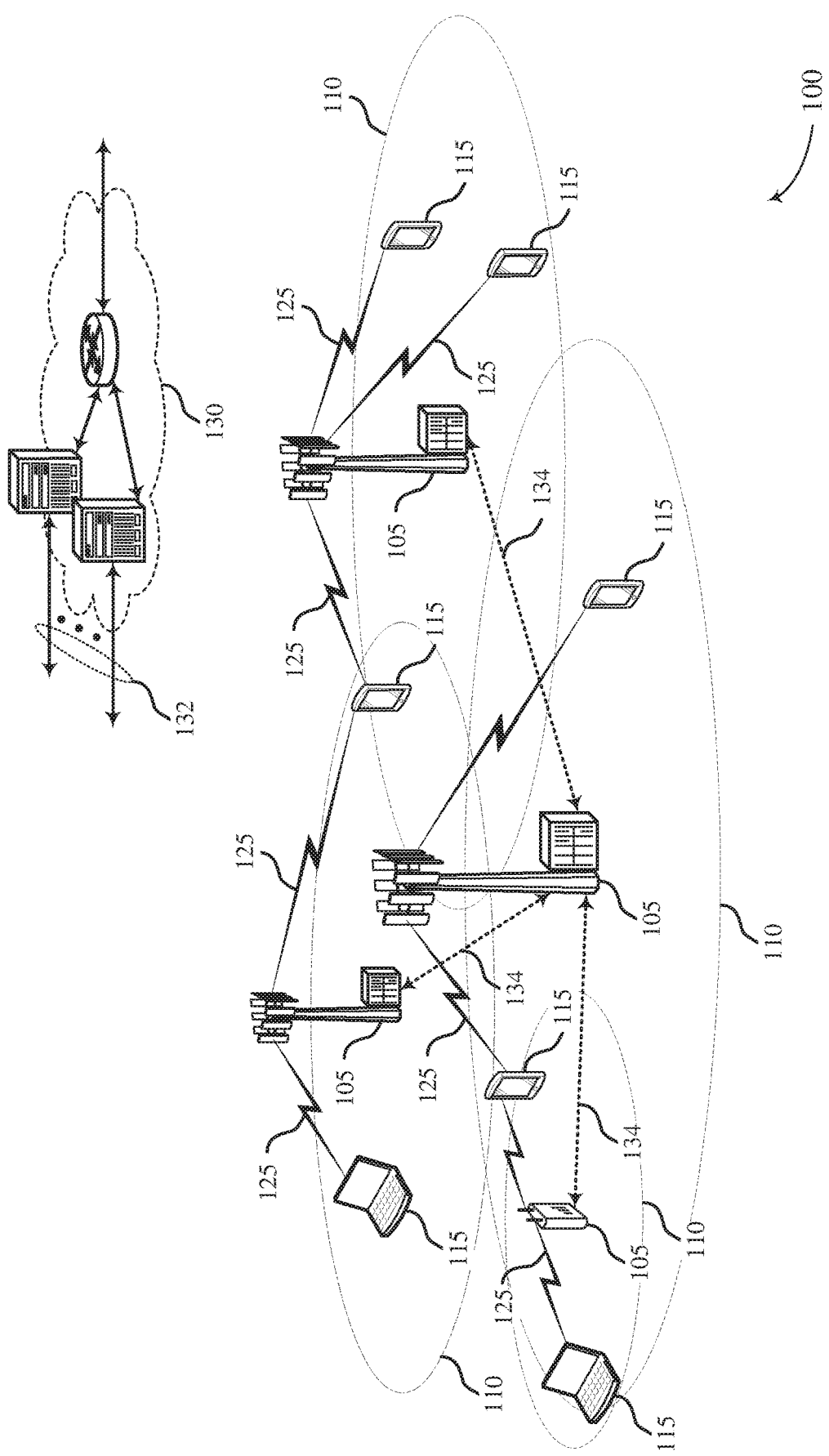
FIG. 1 illustrates an example of a system for wireless communication that supports dual bearer application data streaming in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (e.g., mission critical) communications, low latency communications, and communications with low-cost and low-complexity devices.

Base stations 105 may wirelessly communicate with UEs 115 (e.g., using various RATs or wireless technologies) via one or more base station antennas. Each base station 105 may provide communication coverage for a respective geographic coverage area 110. Each base station 105 may provide communication coverage for a macro cell, a small cell, or other types of cell. The term "cell" is a 3rd Generation Partnership Project "3GPP" term that can be used to describe a base station, a carrier or component carrier associated with a base station, or a coverage area (e.g., sector, etc.) of a carrier or base station, depending on context. Communication links 125 shown in wireless communications system 100 may include uplink (UL) transmissions from a UE 115 to a base station 105, or downlink (DL) transmissions, from a base station 105 to a UE 115.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, an access terminal (AT), a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, e.g., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. A base station 105 may also be referred to as an access point ("AP"), a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A base station 105 may be connected by an S1 interface to the core network 130. The core network 130 may be an evolved packet core (EPC), which may include at least one mobility management entity (MME), at least one serving gateway (SGW), and at least one packet data network (PDN) gateway (PGW). The MME may be the control node that processes the signaling between the UE 115 and the EPC. All user IP packets may be transferred through the SGW, which itself may be connected to the PGW. The PGW may provide IP address allocation as well as other functions. The PGW may be connected to the network operators' IP services. The operators' IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-*a* may include subcomponents such as an access network entity, which may be an example of an access node controller (ANC). Each access network entity may communicate with a number of UEs 115 through a number of other access network transmission entities, which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device or core network supporting radio bearers for user plane data. At the Physical (PHY) layer, transport channels may be mapped to physical channels.

Wireless communications system 100 may support dual bearer application data streaming. For example, UEs 115 in wireless communications system 100 may include an application or application client that communicates with an application server to request a downlink data stream. In wireless communications system 100, UEs 115 may do so by establishing communication links 125 with one or more base stations 105, which in turn may communicate with the core network 130 via backhaul links 132. In doing so, the requesting UE 115 may identify a bearer (e.g., a default bearer) and request establishment of a second bearer (e.g., a high priority bearer) for use in streaming downlink data from, for example, the application server. The UE 115 may determine a status of a playout buffer and select the first bearer or the second bearer for use in streaming the downlink data associated with the application based on the status of the playout buffer or, in some cases, additional criteria.

Figure 2:
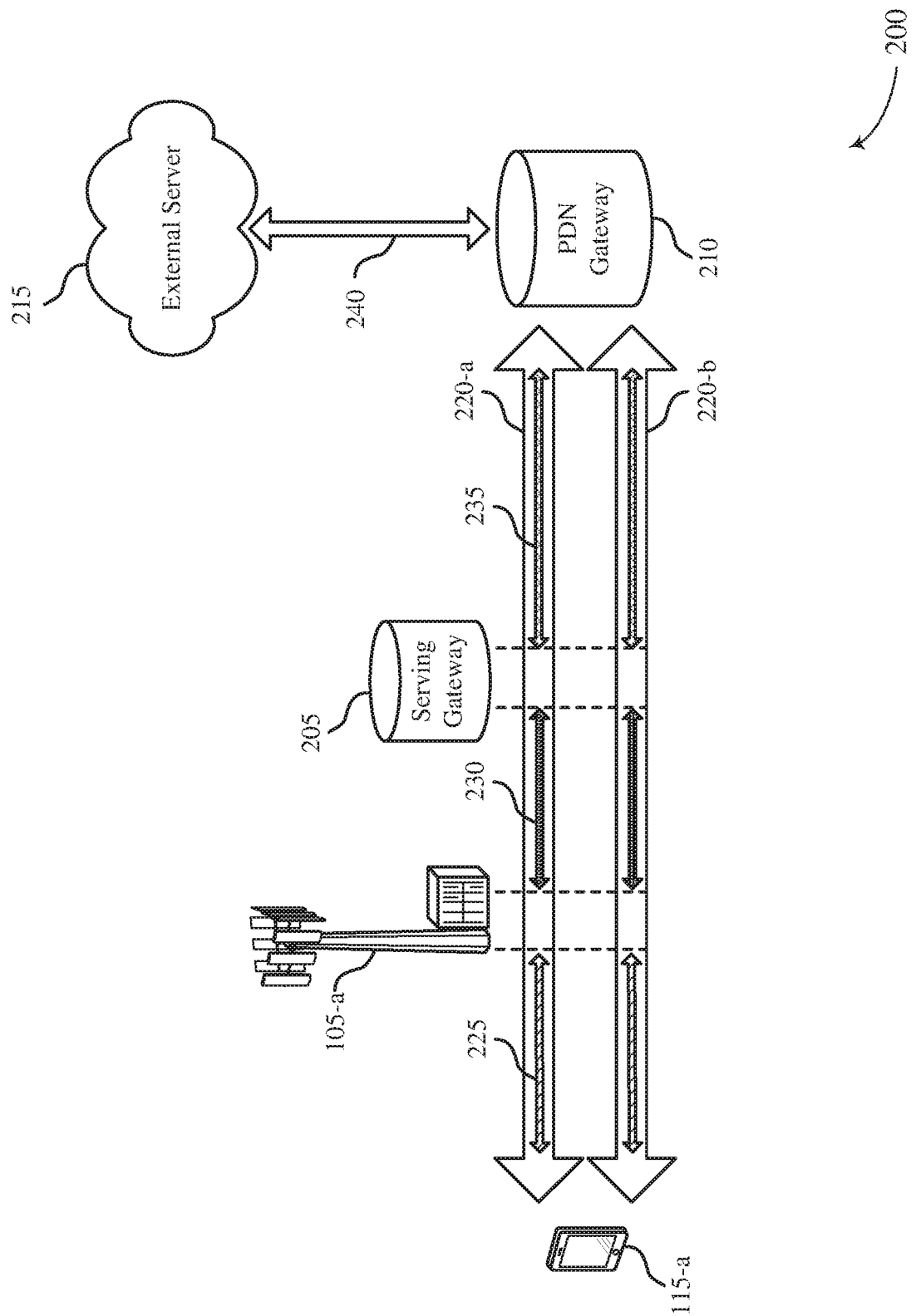
FIG. 2 illustrates an example of a wireless communication system that supports dual bearer application data streaming in accordance with aspects of the present disclosure.

FIG. 2 illustrates an example of a wireless communications system 200 for dual bearer application data streaming in accordance with aspects of the present disclosure. Wireless communications system 200 may include a base station 105-a and a UE 115-a, which may be examples of the corresponding devices described with reference to FIG. 1. Wireless communications system 200 may additionally include a SGW 205, a PGW 210, and external server 215. In some cases, external server 215 may alternatively be referred to as a PDN.

PGW 210 may provide connectivity from UE 115-a to one or more external servers 215 by acting as a point of exit and entry for traffic associated with UE 115-a. In some cases, a UE 115-a may have simultaneous connectivity with more than one PGW 210 for accessing multiple external servers 215. In some cases, a UE 115-a may couple and/or connect with multiple external servers 215 through the same PGW 210. In some cases, multiple PGWs 210 may be used for accessing one or more external servers 215. External server 215 may store data content, e.g., to be transmitted to UE 115-a through PGW 210. As an example, external server 215 may represent a network operator's servers, the Internet, or the IP multimedia system. In some aspects of the present disclosure, external server 215 may store video content. External server 215 may communicate with one or more PGWs 210 via one or more communication links 240.

UE 115-a may communicate with external server 215 through base station 105-a, SGW 205, and PGW 210. In some cases, this communication may be associated with a given QoS, which may include parameters such as e.g., a guaranteed data rate, a maximum error rate, and a maximum delay. Such QoS for a given communication may be achieved by the use of a bearer 220. In some cases, bearer 220 may represent an evolved packet system (EPS) bearer, which may comprise a radio bearer 225 and a core network bearer. In some cases, a core network bearer may comprise a bearer 230 between base station 105-a and SGW 205 (e.g., an S1 bearer); a core network bearer may additionally comprise a bearer 235 (e.g., an S5/S8 bearer) between SOW 205 and PGW 210 (e.g., an S5/S8 bearer). In some cases, a core network bearer may alternatively be referred to as an evolved packet core (EPC) bearer. In some cases, there may be a mapping between bearer 220, radio bearer 225, bearer 230 (e.g., and S1 bearer), and bearer 235 (e.g., bearer 220-a may be associated with a specific radio bearer 225, a specific bearer 230 (e.g., a specific S1 bearer), and a specific bearer 235 (e.g., a specific S5/S8 bearer)). Aspects of the techniques for dual bearer application data streaming described herein may be applicable to one or more of bearer 220, radio bearer 225, bearer 230, and/or bearer 235.

In some cases, upon registering with an EPC (e.g., powering on within a network), UE 115-a may be associated with a bearer 220 to provide it with always-on connectivity to at least one external server 215 (e.g., the Internet). Such a bearer may be referred to as a default bearer. In some cases, after establishing a default bearer, UE 115-a may additionally or alternatively request establishment of a second bearer 220, which may be referred to as a dedicated bearer. UE 115-a may receive content from external server 215 via either the first bearer 220 or the second bearer 220. In some cases, a dedicated bearer may share an IP address with a default bearer. Dedicated bearers may additionally be associated with a different QoS (e.g., a higher guaranteed bit rate) than a default bearer. For example, UE 115-a may establish a default bearer and request establishment of a dedicated or priority bearer. UE 115-a bearer selection (e.g., for use for application data streaming such as video) may be based upon a desired QoS, or other conditions as further described below.

As explained above, OTT content, such as downlink video content, may be transmitted in the same way as regular Internet traffic (e.g., using a default bearer), which may lead to a high probability of the video stalling (e.g., high latency). OTT content may refer to the delivery of priority data (e.g., video, audio, etc.) over the Internet (e.g., using IP). In the present example, OTT content may refer to video content associated with an application, which may in turn be associated with (e.g., stored on) a UE 115-a. In order to reduce the probability of video stalling, UE 115-a may request establishment of a dedicated or high priority bearer for streaming content, e.g., video from external server 215 to UE 115-a. However, such a system may prioritize all video content from external server 215, which may be unnecessary at times (e.g., when UE 115-a has a full video buffer). In some cases, this unnecessary prioritization may negatively impact cell capacity or other aspects of communications associated with wireless communications system 200.

An application based alternative solution for dynamically determining transmission priority may reduce the probability of video stalling while mitigating negative effects associated with cell capacity within wireless communications system 200. Such a solution may generally apply to transmissions requiring dynamic or conditional priority control (e.g., not only for video transmissions). In aspects of the present disclosure, an application may use two bearers 220 (e.g., for video downloading). The two bearers 220 may comprise a normal priority bearer 220-a and a high priority bearer 220-b. In some cases, a normal priority bearer (e.g., bearer 220-a) may be an example of a default bearer and high priority bearer (e.g., bearer 220-b) may be an example of a dedicated bearer. Additionally or alternatively, bearer 220-a and bearer 220-b may be dedicated bearers associated with a different priority (e.g., QoS). The UE 115-a may dynamically determine which bearer to use to communicate with external server 215, e.g., based on the level of a video playout buffer. As an example, UE 115-a may dynamically select high priority bearer 220-b when the playout buffer is below a certain threshold (e.g., when the playout buffer does not satisfy a certain threshold).

In some cases, the two bearers 220 may be differentiated by UE-side TCP ports (e.g., associated with the same IP address). As an example, an application may identify an established first bearer for use in streaming downlink data associated with the application (e.g., a default bearer). The application may subsequently configure one or more TCP connections e.g., to facilitate streaming of the downlink data. In some cases, the application may establish the two TCP connections between UE 115-a and PGW 210 (e.g., using a default bearer). These two TCP connections may be associated with the same IP address and different TCP port numbers. The application may request high priority bearer 220-b establishment, e.g., via the second TCP connection using an application programming interface (API) provided by a modem or a high layer operating system (HLOS) of the UE 115-a. That is, the first TCP connection may be associated with normal priority bearer 220-a and the second TCP connection may be associated with high priority bearer 220-b. According to certain aspects, high priority bearer 220-b may be associated with a higher QoS (e.g., a higher guaranteed bit rate) than bearer 220-a (e.g., a normal priority bearer).

In some examples, the application may use the second TCP connection's 5-tuple as a traffic flow template (TFT) filter for high priority bearer 220-b. A 5-tuple may be comprised of at least one of a destination port, destination IP address, source port, source IP address, or a TCP configuration (e.g., a layer 4 protocol). In the present example, while streaming video downloading, UE 115-a may dynamically select one of the two bearers 220, e.g., by monitoring a video playout buffer level. When the buffer is below a threshold, the application may send a video request (e.g., a hypertext transfer protocol (HTTP) GET) on the second TCP connection (e.g., high priority bearer 220-b). The external server 215 may subsequently send video or an HTTP response to the application via PGW 210 using the same bearer as the request (e.g., high priority bearer 220-b). When the buffer is not below a threshold, the application may send the video request on the first TCP connection (e.g., normal priority bearer 220-a). The external server 215 may subsequently send a response to the application via PGW 210 using normal priority bearer 220-a.

Additionally or alternatively, the two bearers 220 may be differentiated by UE-side IP addresses, e.g., using two separate PDN connections. In some cases, this may allow for higher throughput for wireless communications system 200. As an example, the application may identify an established PDN connection (e.g., a default bearer) as described above. The application may subsequently initiate a second PDN connection to external server 215 via PGW 210 using an API provided by a modem or HLOS associated with UE 115-a. The application may setup two TCP connections. The first TCP connection may be established using the first PDN connection and may be associated with normal priority bearer 220-a. The second TCP connection may be established using the second PDN connection and may be associated with high priority bearer 220-b. In some cases, the application may use the second TCP connection's 5-tuple as a TFT filter for high priority bearer 220-b. According to certain aspects, UE 115-a may dynamically select one of either bearer 220-a or bearer 220-b, e.g., by monitoring a video playout buffer level as described above.

In some cases, an HLOS associated with UE 115-a may not support dual IP bearer establishment. In one embodiment, the application may default to the two TCP port option (e.g., differentiating the two bearers 220 by UE-side TCP ports). Additionally or alternatively, a modem associated with UE 115-a may map the two UE-side TCP ports (e.g., which may be associated with a single UE-side IP address) to two UE-side IP addresses using network address translation (NAT). In the present example, the external server 215 may transmit downlink data associated with the application to the modem using two UE-side IP addresses (e.g., there may be two PDN connections). The modem may subsequently map the two UE-side IP addresses to two UE-side TCP ports associated with a same IP address, such that communications between the modem and upper layers of the UE (e.g., an application or the HLOS of the UE) appear to be associated with a single IP address. In some cases, the modem may include logic enabling it to decide which of these options to employ, as described below with reference to FIG. 4.

In some cases, high priority bearer 220-b may be associated with network or operator-imposed incentives (e.g., a higher price) to avoid overuse by the application and/or UE 115-a. Frequent high priority requests may affect the experience of other UEs 115 (not shown) in wireless communications system 200. As a deterrent, a network operator may charge higher prices for using high priority bearer 220-b e.g., to prevent the application from excessively using the high priority bearer 220-b. Additionally or alternatively, the mobile network operator may configure a quota for the high priority bearer 220-b (e.g., a maximum percentage of high priority traffic). High priority traffic exceeding the quota may be delivered over the normal priority bearer 220-a. That is, in some cases, bearer selection may be requested by UE 115-a or a modem associated with UE 115-a (e.g., based on a playout buffer status) but may be further influenced by PGW 210 (e.g., according to a usage quota for the bearer 220-b).

Figure 3:
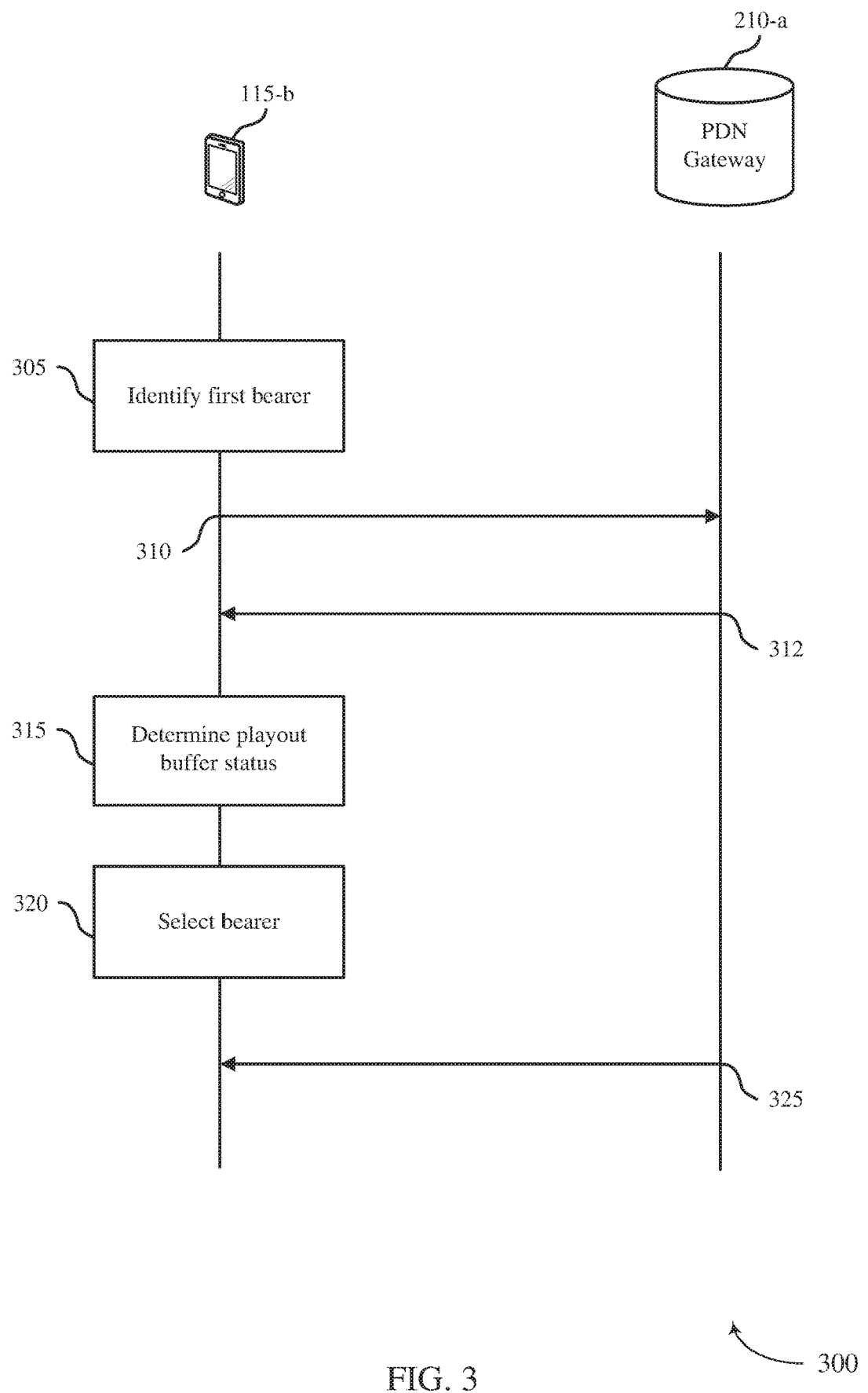
FIG. 3 illustrates an example of a process flow for dual bearer application data streaming in accordance with aspects of the present disclosure.

FIG. 3 illustrates an example of a process flow 300 between a UE 115-b and a PGW 210-a for dual bearer application data streaming in accordance with aspects of the present disclosure. UE 115-b and PGW 210-a may be examples of the corresponding devices described with reference to FIGS. 1 and 2. In some cases, UE 115-b may communicate with PGW 210-a via at least one of a base station 105 and a SGW 205, as described above with reference to FIG. 2. In the present example, PGW 210-a may be in communication with one or more external servers 215. In aspects of the present example, UE 115-b may be associated with an application. Actions described as being performed by UE 115-b may additionally or alternatively be performed (e.g., initiated) by the application.

At step 305, UE 115-b may identify a first bearer (e.g., a default bearer) used for communicating with PGW 210-a (e.g., for streaming downlink data associated with an application). In some cases, the first bearer may be an example of a normal priority bearer and may be associated with a certain QoS as described above with reference to FIG. 2. In some cases, the first bearer may be associated with a first TCP connection.

At step 310, UE 115-b may request establishment of a second bearer (e.g., a high priority bearer) for use in communicating with PGW 210-a (e.g., for streaming downlink data associated with the application). In some cases, the high priority bearer may be associated with a higher QoS than the normal priority bearer. In some cases, the high priority bearer establishment may be requested using one or more parameters of a second TCP connection. At step 312, UE 115-b may stream downlink data from or via PGW 210-a. In some examples, the downlink data stream may include video content. At step 315, UE 115-b may determine the status of a playout buffer associated with the downlink data stream of step 312. In aspects of the present example, the size of the playout buffer may be compared to a certain threshold. At step 320, UE 115-b may select a bearer (e.g., the normal priority bearer or the high priority bearer) for use in streaming the downlink data. In the present example, this selection may be based at least on the status (e.g., size) of the playout buffer as determined at step 315. In some cases, the first (e.g., normal priority) bearer may be selected based at least in part on an amount of data in the playout buffer satisfying a threshold. In some cases, the second (e.g., high priority) bearer may be selected based at least in part on an amount of data in the playout buffer not satisfying a threshold (e.g., a low buffer status). In some cases, UE-115b may select the first or second bearer based on a network or operator imposed incentive. Additionally or alternatively, UE 115-b may select the first or second bearer based on a monetary cost associated with the use of the second bearer. In some cases, UE 115-b may select the first or second bearer based on a quota associated with use of the second bearer (e.g., where the quota is a percentage of requests for use of the second bearer). At step 325, UE 115-b may receive the downlink data stream on the bearer selected at step 320. In some cases, the downlink data stream may include video data. Additionally or alternatively, the downlink data stream may include priority data.

In some cases, communication between UE 115-b and PGW 210-a may use a first TCP port associated with the first TCP connection at the UE 115-b for communicating on the first bearer and a second TCP port associated with the second TCP connection at the UE 115-b for communicating on the second bearer. Additionally or alternatively, communication between UE 115-b and PGW 210-a may use a first IP address associated with the UE 115-b for communicating on the first bearer and a second IP address associated with the UE 115-b for communicating on the second bearer.

In some cases, establishment of the second bearer may include establishing two TCP connections (e.g., a first TCP connection and a second TCP connection) using the first bearer and requesting establishment of the second bearer using one or more parameters of the second TCP connection. As an example, UE 115-b may establish the second bearer using an API provided by at least one of a modem or an HLOS associated with the UE 115-b to request establishment of the second bearer based at least on a TFT filter. In some cases, the TFT filter may be based on a 5-tuple of the second TCP connection.

In some cases, establishment of the second bearer may include initiating two PDN connections (e.g., a first PDN connection and a second PDN connection) via an API provided by at least one of a modem or an HLOS associated with the UE 115-b. Establishment of the second bearer may additionally include establishing a first TCP connection using the first PDN connection and a second TCP connection using the second PDN connection. Establishment of the second bearer may be requested using one or more parameters associated with the second TCP connection.

In some cases, the bearer used for communication between UE 115-b and PGW 210-a may be selected based on a determination that an HLOS of the UE 115-b lacks support for dual IP bearer establishment. In this example, a first IP address associated with the UE 115-b may be used for communication on the first bearer, and a second IP address associated with the UE 115-b may be used for communication on the second bearer. In some cases, a first TCP port associated with the first TCP connection at the UE 115-b may be mapped to a first IP address and a second TCP port associated with the second TCP connection at the UE 115-b may be mapped to a second IP address (e.g., using NAT).

In some cases, UE 115-b may select the second bearer based on determining that an amount of data in a playout buffer does not satisfy a threshold. In the present example, the UE 115-b may send a request (e.g., a video request) via a second TCP connection over the second bearer (e.g., a priority bearer). In some cases, UE 115-b may select the first bearer based on determining that an amount of data in the playout buffer satisfies a threshold. In this example, the UE 115-b may send a request (e.g., a video request) via the first TCP connection over the first bearer. In some cases, the first bearer may be associated with a default bearer and the second bearer may be a dedicated bearer. In some examples, the second bearer may be a priority bearer having a priority (e.g., a QoS) that is greater than that of the first bearer.

In some cases, UE 115-b requesting establishment of a bearer (e.g., a first or second bearer) for use in streaming downlink data may include an application client associated with UE 115-b requesting establishment of the bearer. In some cases, the application client may associate the first TCP connection with the first bearer and the second TCP connection with the second bearer. In some cases, the application may associate the first TCP connection with a first TCP port and a first IP address, and may associate the second TCP connection with a second TCP port and the first IP address. In some cases, the application may associate the first TCP connection with a first TCP port and the first IP address, and may associate the second TCP connection with the second TCP port and a second IP address. In some cases, the first and second bearers may include at least one of a radio bearer, a core network bearer, or an EPS bearer. In some cases, the first and second bearers may be EPS bearers. In some cases, an EPS bearer may include a combination of a bearer between UE 115-b and a base station, a bearer between the base station and a SGW, and a bearer between a SGW and a PGW.

Figure 4:
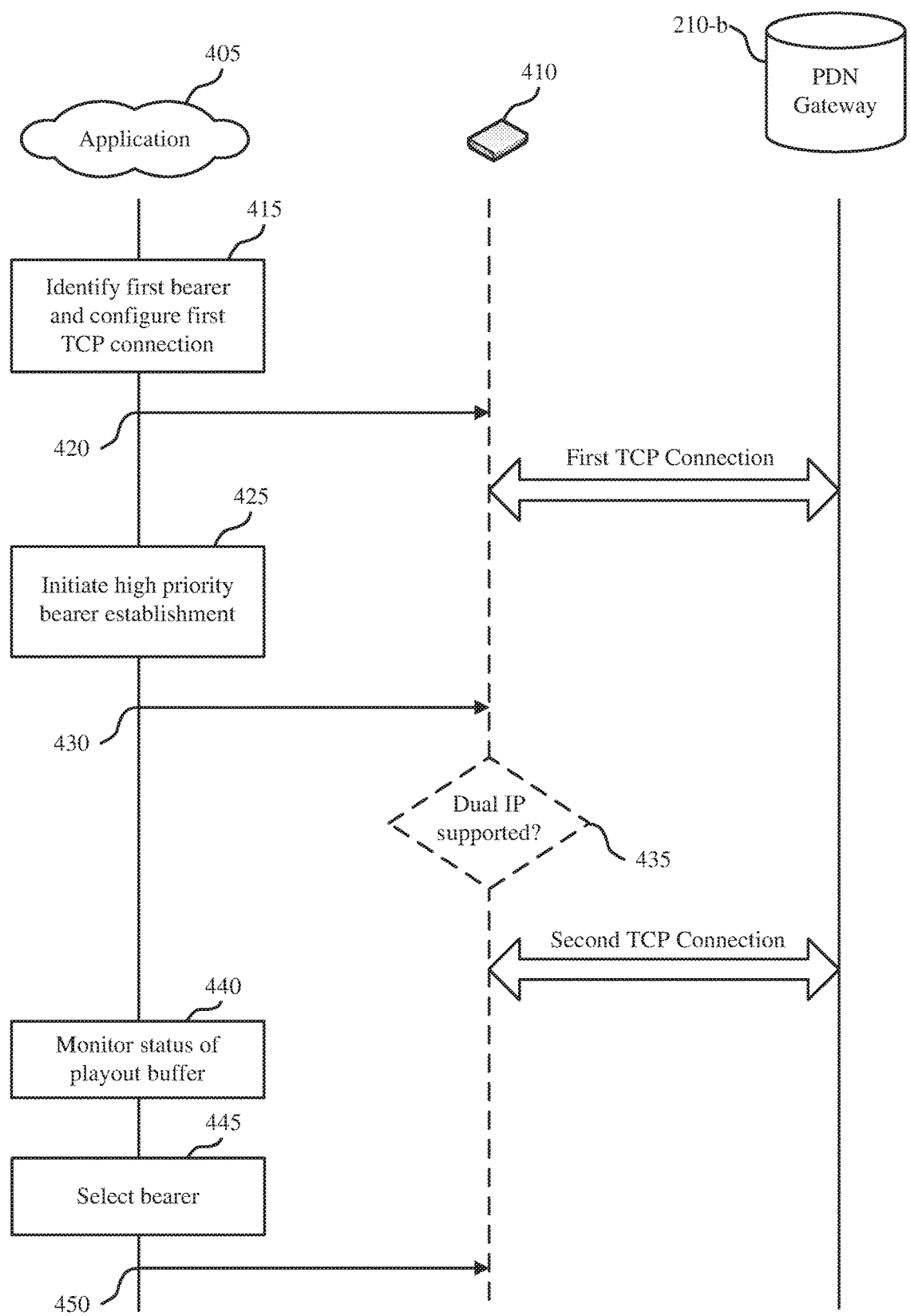
FIG. 4 illustrates an example of a process flow for dual bearer application data streaming in accordance with aspects of the present disclosure.

FIG. 4 illustrates an example of a process flow 400 for dual bearer application data streaming in accordance with aspects of the present disclosure. Process flow 400 may include an application 405, a modem 410, and PGW 210-b, each of which may be in communication with each other. In some cases, PGW 210-b may be in communication with an external server (not shown), which may be an example of external server 215 described with reference to FIG. 2.

In some cases, application 405 may be associated with a UE 115, which may be an example of the corresponding device described with reference to FIG. 1. In the present example, application 405 may communicate with or via PGW 210-*b* e.g., to stream data from external server 215. In some cases, a default bearer may be established between application 405 and PGW 210-*b* e.g., when a UE 115 associated with application 405 initiates a communication session with an external server 215 as described above with reference to FIG. 2. The default bearer may be associated with a UE-side IP address.

In some cases, modem 410 may be integrated (e.g., physically) with UE 115. In some embodiments of the present disclosure, UE 115 may comprise application 405 and be in communication with modem 410 (e.g., an external modem). In some cases, modem 410 may represent an intermediate point for communication between application 405 and PGW 210-*b* (e.g., a relay point). Although referred to as a modem, modem 410 may represent any of a plurality of intermediate devices (e.g., a router) between the application 405 and PGW 210-*b*.

At step 415, application 405 may identify a first bearer (e.g., a default bearer) as described above with reference to FIG. 3. Application 405 may additionally or alternatively configure a first TCP connection associated with the first bearer. In some cases, configuring the first TCP connection may comprise specifying a UE-side TCP port to be used e.g., in communicating with PGW 210-*b*.

At step 420, application 405 may request establishment of the first TCP connection (e.g., using the previously identified default bearer). In some cases, the first TCP connection may be between an external modem 410 and a PGW 210-*b*. In some cases (e.g., when modem 410 is physically integrated with a UE 115), the first TCP connection may be between the UE 115 and PGW 210-*b*. The first TCP connection may be associated with normal priority bearer 220-*a* as described with reference to FIG. 2.

At step 425, application 405 may initiate establishment of a second TCP connection. In some cases, application 405 may identify one or more parameters associated with the second TCP connection. In aspects, the parameters may include at least one of a second UE-side TCP connection or a second UE-side IP address. In some cases, the second TCP connection may be associated with a higher QoS than the first TCP connection.

At step 430, application 405 may transmit a request to establish a second bearer using one or more of the parameters associated with the second TCP connection (e.g., via modem 410). In some cases, the second TCP connection may be established using the first TCP connection (e.g., by communicating the request using the first TCP connection). In some embodiments, the second TCP connection may be initiated using a second PDN connection (e.g., where the first TCP connection represents an example of a first PDN connection). In some cases, the request may comprise the use of an API. The API may be provided by at least one of modem 410 or an HLOS associated with UE 115. In some examples, the request may include one or more parameters associated with the second TCP connection (e.g., a 5-tuple of the second TCP connection). A 5-tuple may be comprised of at least one of a UE-side TCP port, UE-side IP address, PGW-side TCP port, PGW-side IP address, or a TCP configuration. In some cases, these parameters may comprise a TFT filter. In some cases, the second TCP connection may be associated with at least one of a second UE-side TCP port or a second UE-side IP address (e.g., as a parameter of the TFT filter) as described above with reference to FIG. 2. The second TCP connection may be associated with high priority bearer 220-*b* as described with reference to FIG. 2.

At step 435, modem 410 may optionally determine whether an HLOS associated with a UE 115 supports dual IP bearer establishment (e.g., based at least in part on logic stored in modem 410). In some cases (e.g., when dual IP bearer establishment is not supported), modem 410 may map the two UE-side TCP ports (e.g., which application 405 may associate with a single IP address) to two UE-side IP addresses using NAT as described with reference to FIG. 2. In the present example, external server 215 may communicate with modem 410 via PGW 210-*b* using two UE-side IP addresses. Modem 410 may subsequently communicate with the application 405 using two UE-side TCP port addresses.

At step 440, application 405 may monitor the status of a buffer associated with downlink data transmissions from external server 215. In some cases, application 405 may determine the size of the playout buffer in relation to one or more thresholds. As an example, application 405 may determine that the size of the playout buffer is less than a certain threshold.

At step 445, application 405 may select the first or second TCP connection for use in streaming downlink data associated with the application. In some cases, the selection may be based at least in part on the status of the buffer as determined at step 440. In some cases, the selection may additionally or alternatively be based at least in part on a network or operator-imposed incentive (e.g., a cost or quota) as described above with reference to FIG. 2.

At step 450, application 405 may transmit a data request (e.g., on the TCP connection selected at step 445). External server 215 may subsequently send a response (e.g., downlink data associated with application 405) using the same TCP connection selected at step 445. In some cases, the downlink bearer selection may be performed by PGW 210-*b* and the uplink bearer selection may be performed by application 405 or modem 410.

Figure 5:
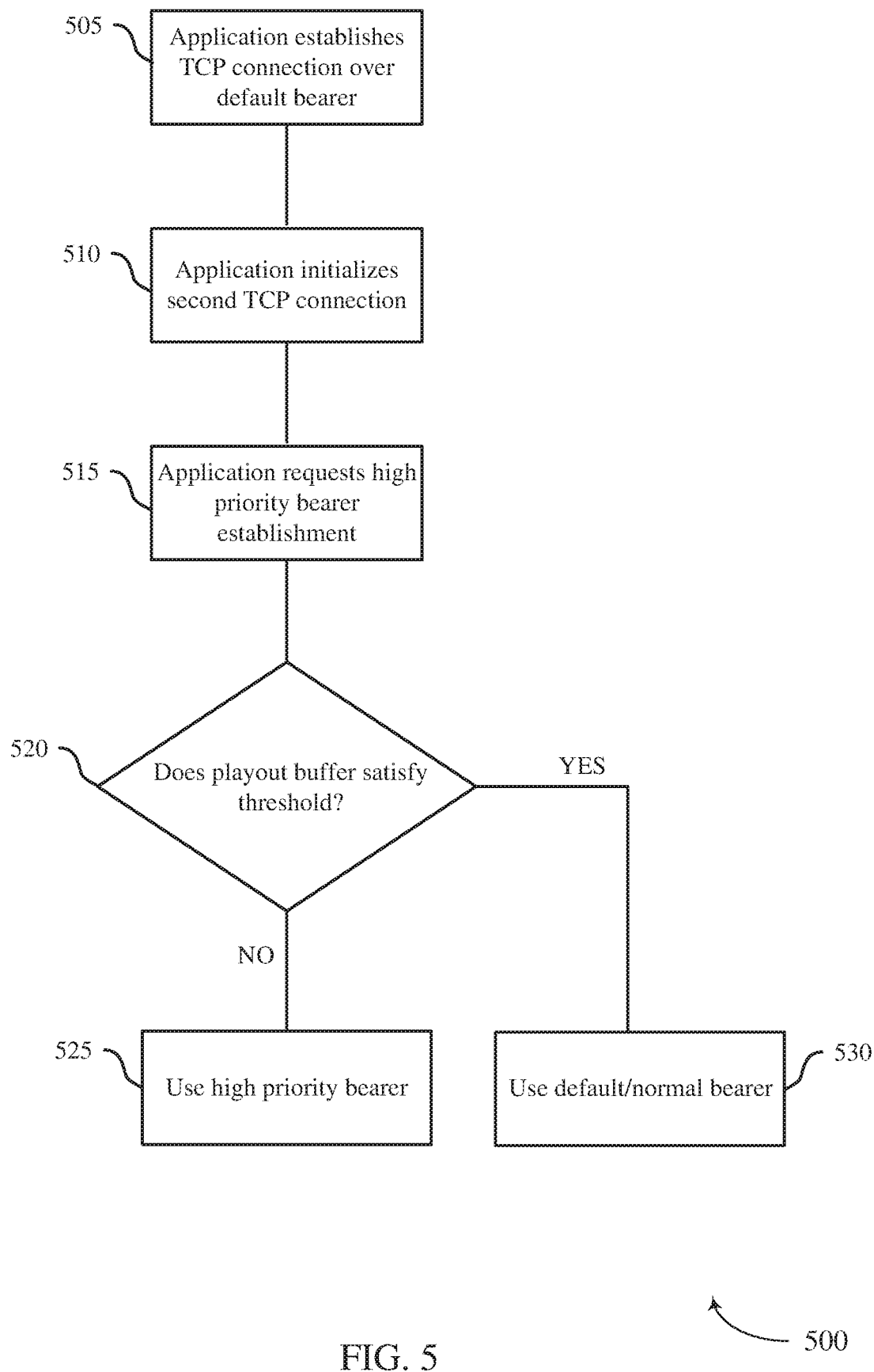
FIG. 5 illustrates an example of a method for dual bearer application data streaming in accordance with aspects of the present disclosure.

FIG. 5 illustrates an example of a method 500 for dual bearer application data streaming in accordance with aspects of the present disclosure. The operations of method 500 may be implemented by a device such as a UE 115 or its components (e.g., application 405) as described with reference to FIGS. 1-4.

At block 505, an application (e.g., associated with a UE 115) may establish a first TCP connection over a default bearer as described above with reference to FIG. 2 for use in streaming downlink data from a PDN. At block 510, the application may initialize a second TCP connection. In the present example, the second TCP connection may be established using the default bearer. At block 515, the application may request establishment of a second (e.g., high priority) bearer. In aspects of the present example, the request for the second bearer may comprise one or more parameters of the second TCP connection (e.g., a 5-tuple).

At block 520, the application may monitor the size of a buffer (e.g., associated with the downlink data transmission). The application may determine whether the playout buffer satisfies a threshold. If the buffer size does not satisfy the threshold, the application may receive downlink data via the second TCP connection with a high priority bearer at step 525. If the buffer size satisfies (e.g., exceeds) the threshold, the application may receive downlink data via the first TCP connection with a default bearer at step 530.

Figure 6:
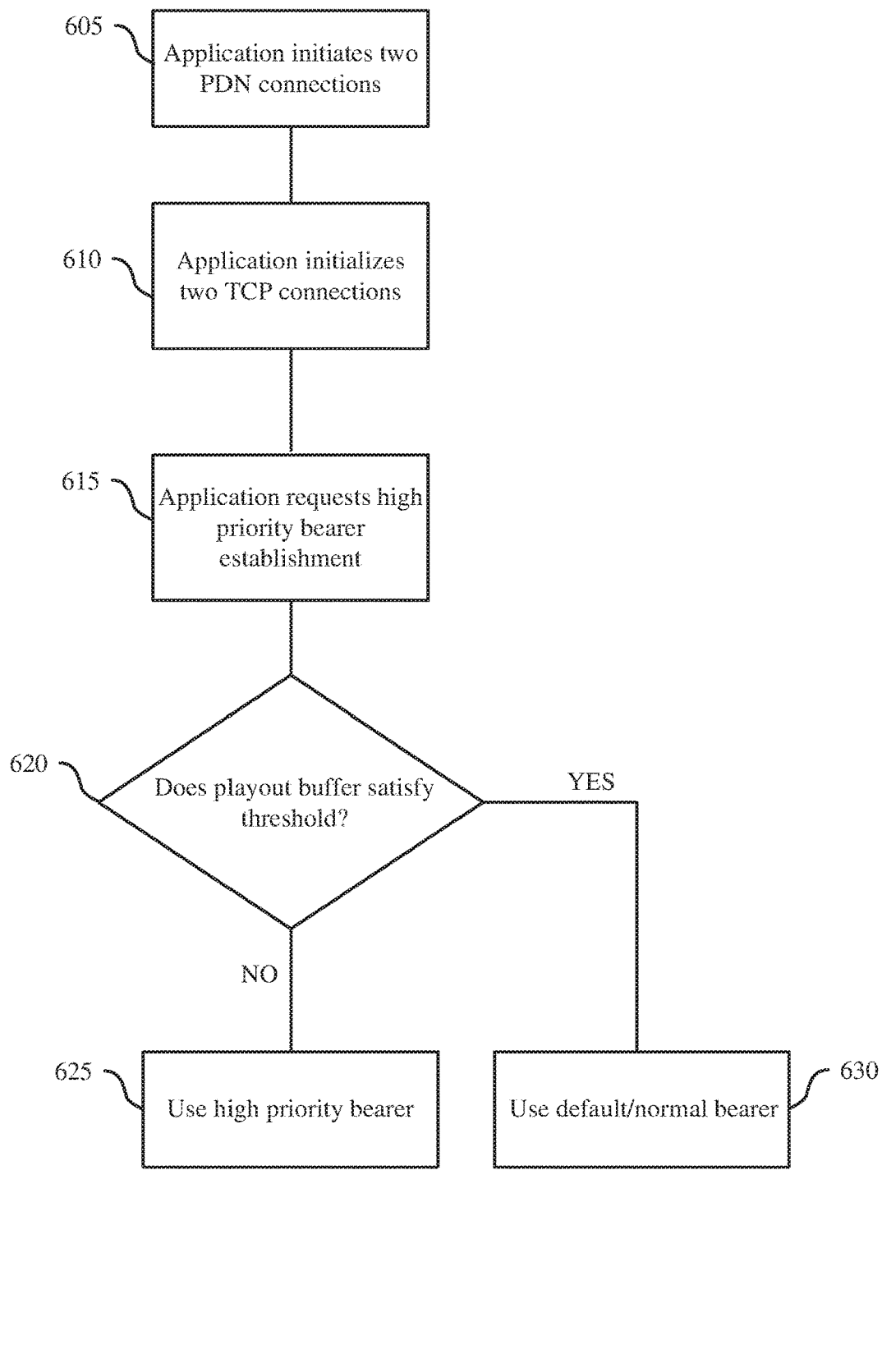
FIG. 6 illustrates an example of a method for dual bearer application data streaming in accordance with aspects of the present disclosure.

FIG. 6 illustrates an example of a method 600 for dual bearer application data streaming in accordance with aspects of the present disclosure. The operations of method 600 may be implemented by a device such as a UE 115 or its components (e.g., application 405) as described with reference to FIGS. 1-4.

At block 605, an application (e.g., associated with a UE 115) may initiate two PDN connections to be used in streaming downlink data from a PDN as described above with reference to FIG. 2. In some aspects of the present disclosure, UE 115 may have previously established the first PDN connection and the application may initiate a second PDN connection.

At block 610, the application may initialize two TCP connections. In aspects of the present example, the first TCP connection may be established using the previously established first PDN connection and the second TCP connection may be established using the second PDN connection. The first TCP connection may be associated with a default bearer.

At block 615, the application may request establishment of a second (e.g., high priority) bearer using the second PDN connection. In aspects of the present example, the request for the second bearer may comprise one or more parameters of the second TCP connection (e.g., a 5-tuple).

At block 620, the application may monitor the size of a buffer (e.g., associated with the downlink data transmission). The application may determine whether the playout buffer satisfies a threshold. If the buffer size does not satisfy the threshold, the application may receive downlink data via the second TCP connection (e.g., the second bearer) with a high priority bearer at step 625. If the buffer size satisfies (e.g., exceeds) the threshold, the application may receive downlink data via the first TCP connection (e.g., the first bearer) with a default bearer at step 630. In this manner, such downlink data may selectively be received using the first and/or second bearer.

Figure 7:
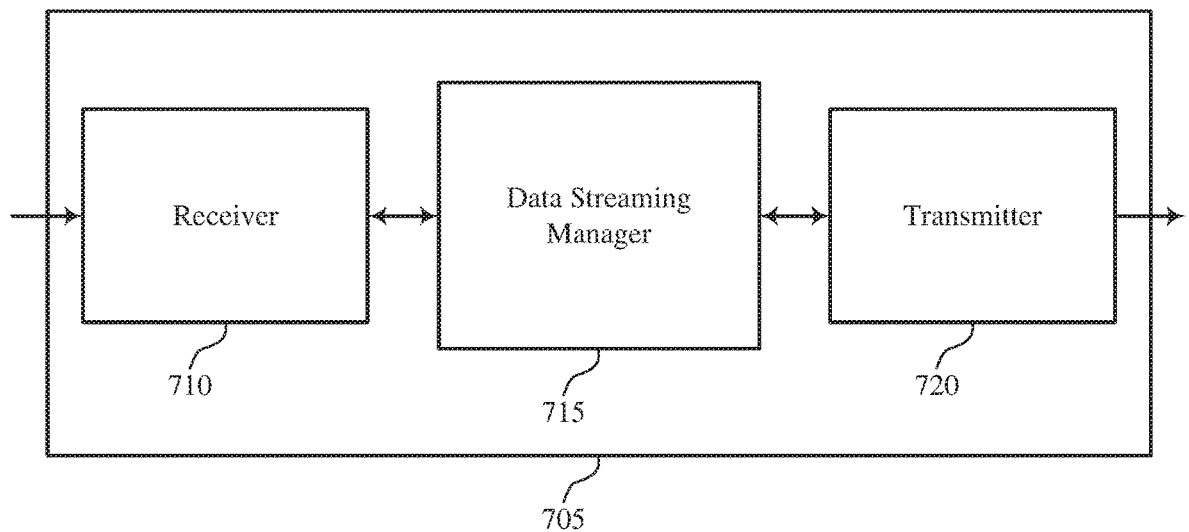
FIGS. 7 through 9 show block diagrams of a device that supports dual bearer application data streaming in accordance with aspects of the present disclosure.

FIG. 7 shows a block diagram 700 of a wireless device 705 that supports dual bearer application data streaming in accordance with various aspects of the present disclosure. Wireless device 705 may be an example of aspects of a UE 115 as described with reference to FIG. 1. Wireless device 705 may include receiver 710, data streaming manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to dual bearer application data streaming, etc.). Information may be passed on to other components of the device. The receiver 710 may be an example of aspects of the transceiver 1035 described with reference to FIG. 10.

Data streaming manager 715 may be an example of aspects of the data streaming manager 1015 described with reference to FIG. 10. Data streaming manager 715 may identify a first bearer for use in streaming downlink data associated with an application. Further, data streaming manager 715 may request establishment of at least a second bearer for use in streaming the downlink data associated with the application and determine a status of a playout buffer of the UE (e.g., wireless device 705). The data streaming manager 715 may then select, based on the status of the playout buffer, the first bearer or the second bearer for use in streaming the downlink data associated with the application.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
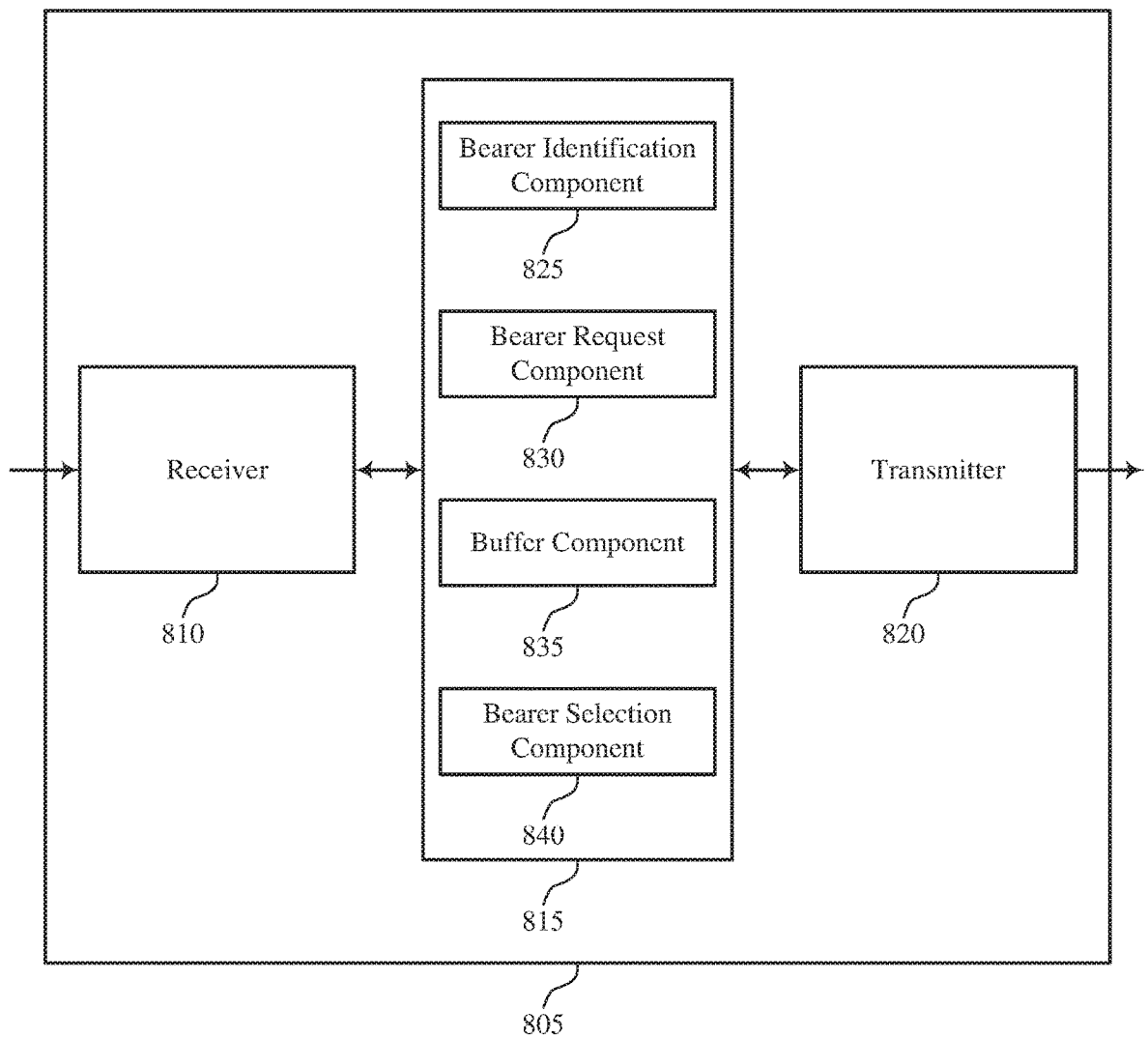

FIG. 8 shows a block diagram 800 of a wireless device 805 that supports dual bearer application data streaming in accordance with various aspects of the present disclosure. Wireless device 805 may be an example of aspects of a wireless device 705 or a UE 115 as described with reference to FIGS. 1 and 7. Wireless device 805 may include receiver 810, data streaming manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to dual bearer application data streaming, etc.). Information may be passed on to other components of the device. The receiver 810 may be an example of aspects of the transceiver 1035 described with reference to FIG. 10.

Data streaming manager 815 may be an example of aspects of the data streaming manager 1015 described with reference to FIG. 10. Data streaming manager 815 may also include bearer identification component 825, bearer request component 830, buffer component 835, and bearer selection component 840.

Bearer identification component 825 may identify a first bearer for use in streaming downlink data associated with an application. In some cases, the downlink data associated with the application includes video data. In some cases, the downlink data associated with the application includes priority data.

Bearer request component 830 may request establishment of at least a second bearer for use in streaming the downlink data associated with the application. The bearer request component 830 may then request, using one or more parameters of the second TCP connection, establishment of the second bearer. Request establishment of at least the second bearer for use in streaming the downlink data may include requesting, by an application client at the UE, establishment of at least the second bearer for use in streaming the downlink data. In some cases, requesting establishment of the second bearer includes using an API provided by at least one of a modem of the UE or an HLOS of the UE to request establishment of the second bearer based at least on a TFT filter. In some cases, the TFT filter is based on a 5-tuple of the second TCP connection. In some cases, requesting establishment of at least the second bearer includes initiating a first PDN connection and a second PDN connection via an API provided by at least one of a modem of the UE or an HLOS of the UE.

Buffer component 835 may determine a status of a playout buffer of the UE. In some cases, selecting the first bearer or the second bearer includes determining that an amount of data in the playout buffer does not satisfy a threshold. In some cases, selecting the first bearer or the second bearer includes determining that an amount of data in the playout buffer satisfies a threshold.

Bearer selection component 840 may select, based on the status of the playout buffer, the first bearer or the second bearer for use in streaming the downlink data associated with the application and select the second bearer based on the amount of data in the playout buffer not satisfying the threshold. In some cases, an EPS bearer is a combination of a bearer between the UE and a base station, a bearer between the base station and a serving gateway, and a bearer between the serving gateway and a packet data network gateway. In some cases, selecting the first bearer or the second bearer further includes selecting the first bearer or the second bearer based on a network or operator-imposed incentive. In some cases, selecting the first bearer or the second bearer includes determining that an HLOS of the UE lacks support for dual IP bearer establishment. In some cases, selecting the first bearer or the second bearer further includes selecting the first bearer or the second bearer based on a monetary cost associated with use of the second bearer. In some cases, selecting the first bearer or the second bearer includes selecting the first bearer based on an amount of data in the playout buffer satisfying a threshold. In some cases, the quota is a percentage of requests for use of the second bearer. In some cases, the first bearer includes a default bearer and the second bearer includes a dedicated bearer having a priority that is greater than that of the default bearer. In some cases, the first bearer and the second bearer each include at least one of a radio bearer, a core network bearer, or an EPS bearer. In some cases, the first bearer includes an EPS bearer. In some cases, the second bearer includes an EPS bearer. In some cases, selecting the first bearer or the second bearer further includes selecting the first bearer or the second bearer based on a quota associated with use of the second bearer.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
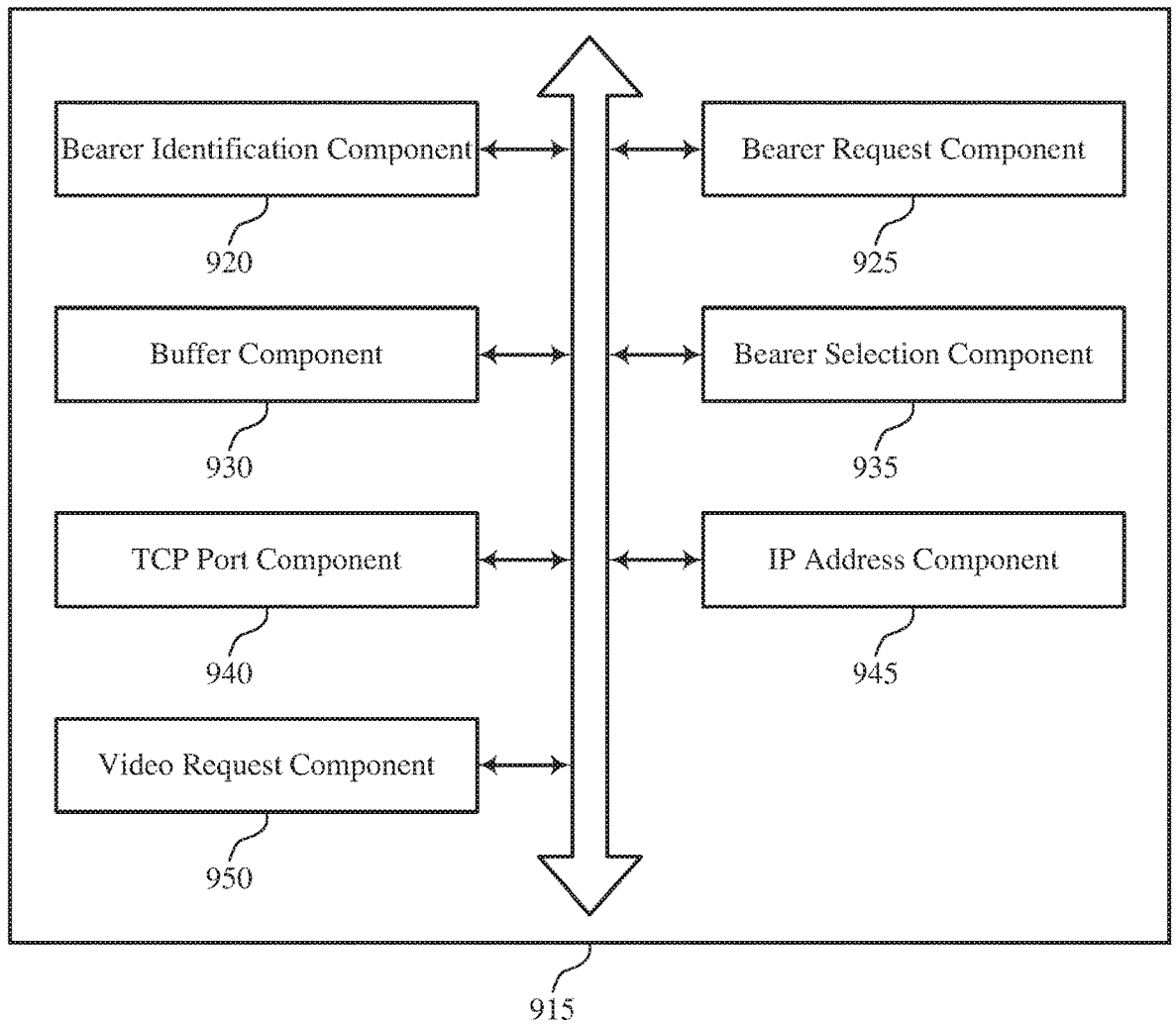

FIG. 9 shows a block diagram 900 of a data streaming manager 915 that supports dual bearer application data streaming (e.g., that supports streaming application data using a first and/or second bearer) in accordance with various aspects of the present disclosure. The data streaming manager 915 may be an example of aspects of a data streaming manager 715, a data streaming manager 815, or a data streaming manager 1015 described with reference to FIGS. 7, 8, and 10. The data streaming manager 915 may include bearer identification component 920, bearer request component 925, buffer component 930, bearer selection component 935, TCP port component 940, IP address component 945, and video request component 950. Each of these modules may communicate, directly or indirectly, with one another (e.g., via one or more buses).

Bearer identification component 920 may identify, at a UE, a first bearer for use in streaming downlink data associated with an application. In some cases, the downlink data associated with the application includes video data. In some cases, the downlink data associated with the application includes priority data.

Bearer request component 925 may request establishment of at least a second bearer for use in streaming the downlink data associated with the application and request, using one or more parameters of the second TCP connection, establishment of the second bearer. In some cases, the request for establishment of at least the second bearer for use in streaming the downlink data includes requesting, by an application client at the UE, establishment of at least the second bearer for use in streaming the downlink data. In some cases, requesting establishment of the second bearer includes using an API provided by at least one of a modem of the UE or an HLOS of the UE to request establishment of the second bearer based at least on a TFT filter. In some cases, the TFT filter is based on a 5-tuple of the second TCP connection. In some cases, requesting establishment of at least the second bearer includes initiating a first PDN connection and a second PDN connection via an API provided by at least one of a modem of the UE or an HLOS of the UE.

Buffer component 930 may determine a status of a playout buffer of the UE. In some cases, selecting the first bearer or the second bearer includes determining that an amount of data in the playout buffer does not satisfy a threshold. In some cases, selecting the first bearer or the second bearer includes determining that an amount of data in the playout buffer satisfies a threshold.

Bearer selection component 935 may select, based on the status of the playout buffer, the first bearer or the second bearer for use in streaming the downlink data associated with the application and select the second bearer based on the amount of data in the playout buffer not satisfying the threshold. In some cases, an EPS bearer is a combination of a bearer between the UE and a base station, a bearer between the base station and a serving gateway, and a bearer between the serving gateway and a packet data network gateway. In some cases, selecting the first bearer or the second bearer further includes selecting the first bearer or the second bearer based on a network or operator-imposed incentive. In some cases, selecting the first bearer or the second bearer includes determining that an HLOS of the UE lacks support for dual IP bearer establishment. In some cases, selecting the first bearer or the second bearer further includes selecting the first bearer or the second bearer based on a monetary cost associated with use of the second bearer. In some cases, selecting the first bearer or the second bearer includes selecting the first bearer based on an amount of data in the playout buffer satisfying a threshold. In some cases, the quota is a percentage of requests for use of the second bearer. In some cases, the first bearer includes a default bearer and the second bearer includes a dedicated bearer having a priority that is greater than that of the default bearer. In some cases, the first bearer and the second bearer each include at least one of a radio bearer, a core network bearer, or an EPS bearer. In some cases, the first bearer includes an EPS bearer. In some cases, the second bearer includes an EPS bearer. In some cases, selecting the first bearer or the second bearer further includes selecting the first bearer or the second bearer based on a quota associated with use of the second bearer.

TCP port component 940 may use a first TCP port associated with a first TCP connection at the UE for communication on the first bearer and establish a second TCP connection using the first bearer. Additionally, TCP port component 940 may establish a first TCP connection using the first PDN connection and establish a second TCP connection using the second PDN connection. The TCP port component 940 may then use the second TCP port associated with a second TCP connection for communication on the second bearer. In some cases, the second TCP connection is associated with a second TCP port and a second IP address. In some cases, the first TCP connection is associated with a first TCP port and a first IP address. In some cases, the second TCP connection is associated with a second TCP port and the first IP address. In some cases (e.g., when the HLOS does not support dual IP), TCP port component 940 may map a first TCP port to a first IP address and map a second TCP port to a second IP address using NAT.

IP address component 945 may use a first IP address associated with the UE for communication on the first bearer and use a second IP address associated with the UE for communication on the second bearer. Video request component 950 may send a video request via a second TCP connection over the second bearer, where the second bearer is a priority bearer and send a video request via a first TCP connection over the first bearer, where the second bearer is a priority bearer having a priority that is greater than that of the first bearer.

Figure 10:
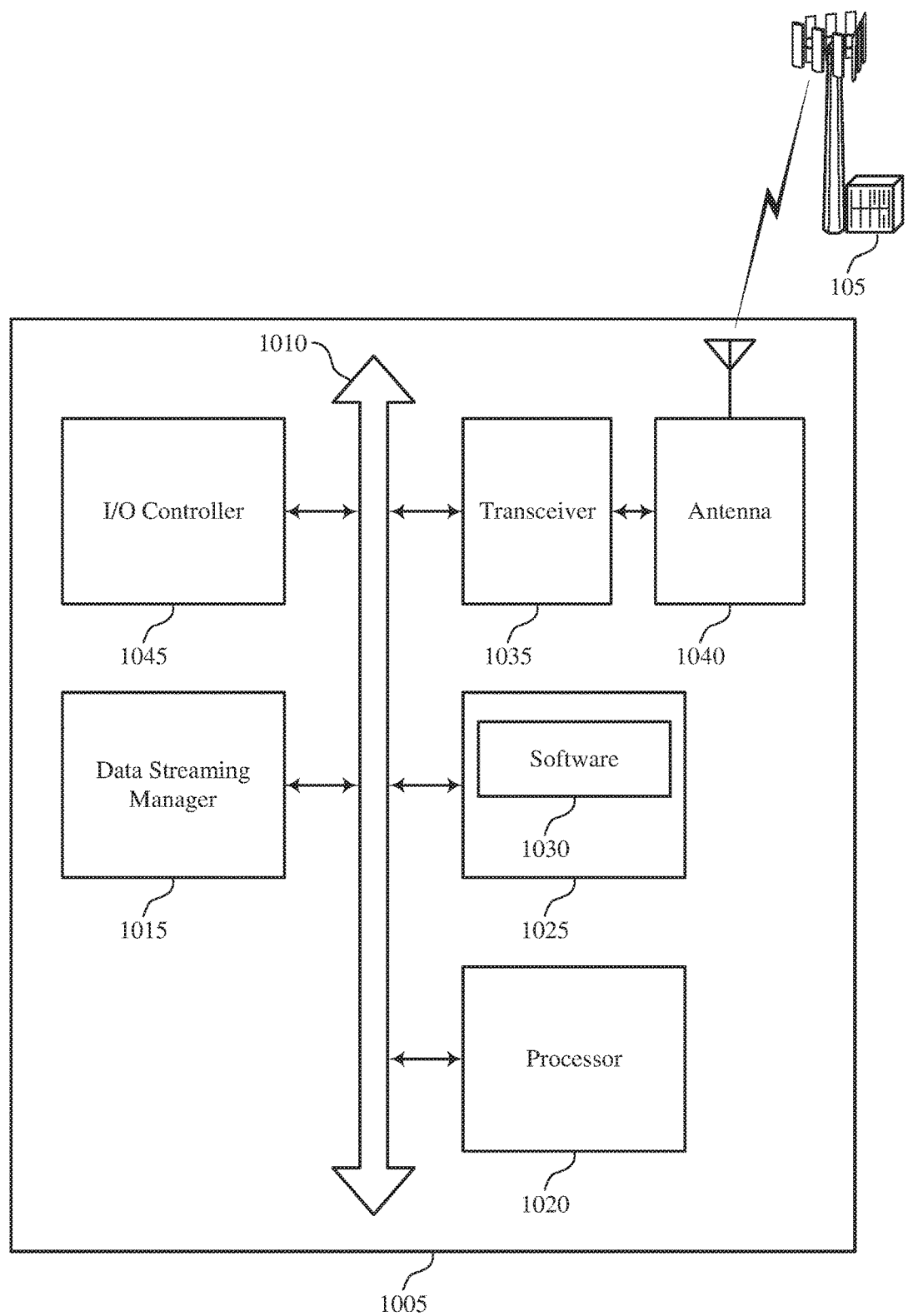
FIG. 10 illustrates a block diagram of a system including a user equipment (UE) that supports dual bearer application data streaming in accordance with aspects of the present disclosure.

FIG. 10 shows a diagram of a system 1000 including a device 1005 that supports dual bearer application data streaming in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including data streaming manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting dual bearer application data streaming).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may include, among other things, a basic input/output system (BIOS) which may control basic hardware and/or software operation such as the interaction with peripheral components or devices.

Software 1030 may include code to implement aspects of the present disclosure, including code to support dual bearer application data streaming. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
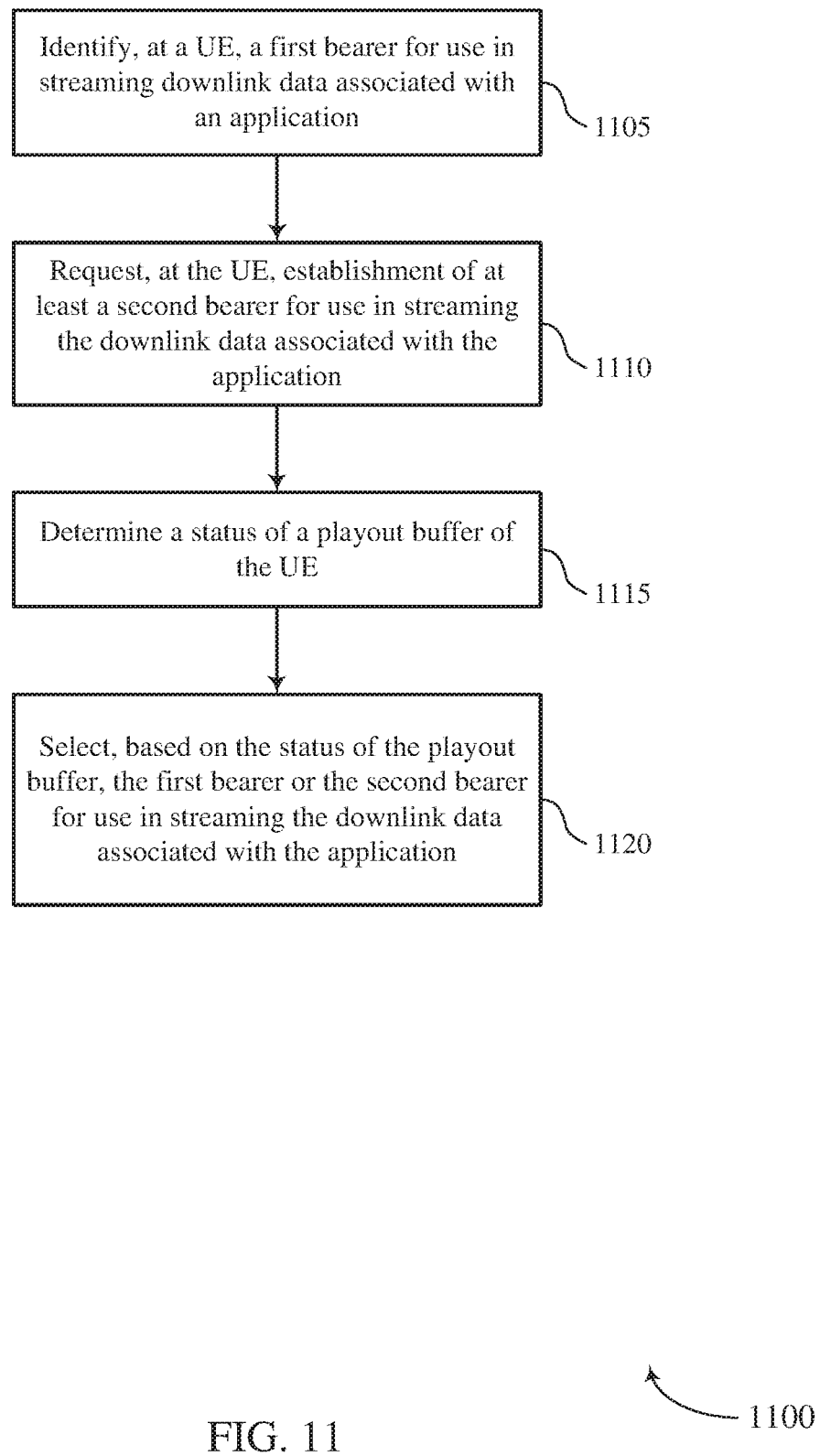
FIGS. 11 through 13 illustrate methods for dual bearer application data streaming in accordance with aspects of the present disclosure.

FIG. 11 shows a flowchart illustrating a method 1100 for dual bearer application data streaming in accordance with various aspects of the present disclosure. The operations of method 1100 may be implemented by a UE 115 or its components as described herein. For example, the operations of method 1100 may be performed by a data streaming manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify, at a UE, a first bearer for use in streaming downlink data associated with an application. The operations of block 1105 may be performed according to the methods described with reference to FIGS. 1 through 6. In certain examples, aspects of the operations of block 1105 may be performed by a bearer identification component as described with reference to FIGS. 7 through 10.

At block 1110 the UE 115 may request, at the UE, establishment of at least a second bearer for use in streaming the downlink data associated with the application. The operations of block 1110 may be performed according to the methods described with reference to FIGS. 1 through 6. In certain examples, aspects of the operations of block 1110 may be performed by a bearer request component as described with reference to FIGS. 7 through 10.

At block 1115 the UE 115 may determine a status of a playout buffer of the UE. The operations of block 1115 may be performed according to the methods described with reference to FIGS. 1 through 6. In certain examples, aspects of the operations of block 1115 may be performed by a buffer component as described with reference to FIGS. 7 through 10.

At block 1120 the UE 115 may select, based at least in part on the status of the playout buffer, the first bearer or the second bearer for use in streaming the downlink data associated with the application. The operations of block 1120 may be performed according to the methods described with reference to FIGS. 1 through 6. In certain examples, aspects of the operations of block 1120 may be performed by a bearer selection component as described with reference to FIGS. 7 through 10.

Figure 12:
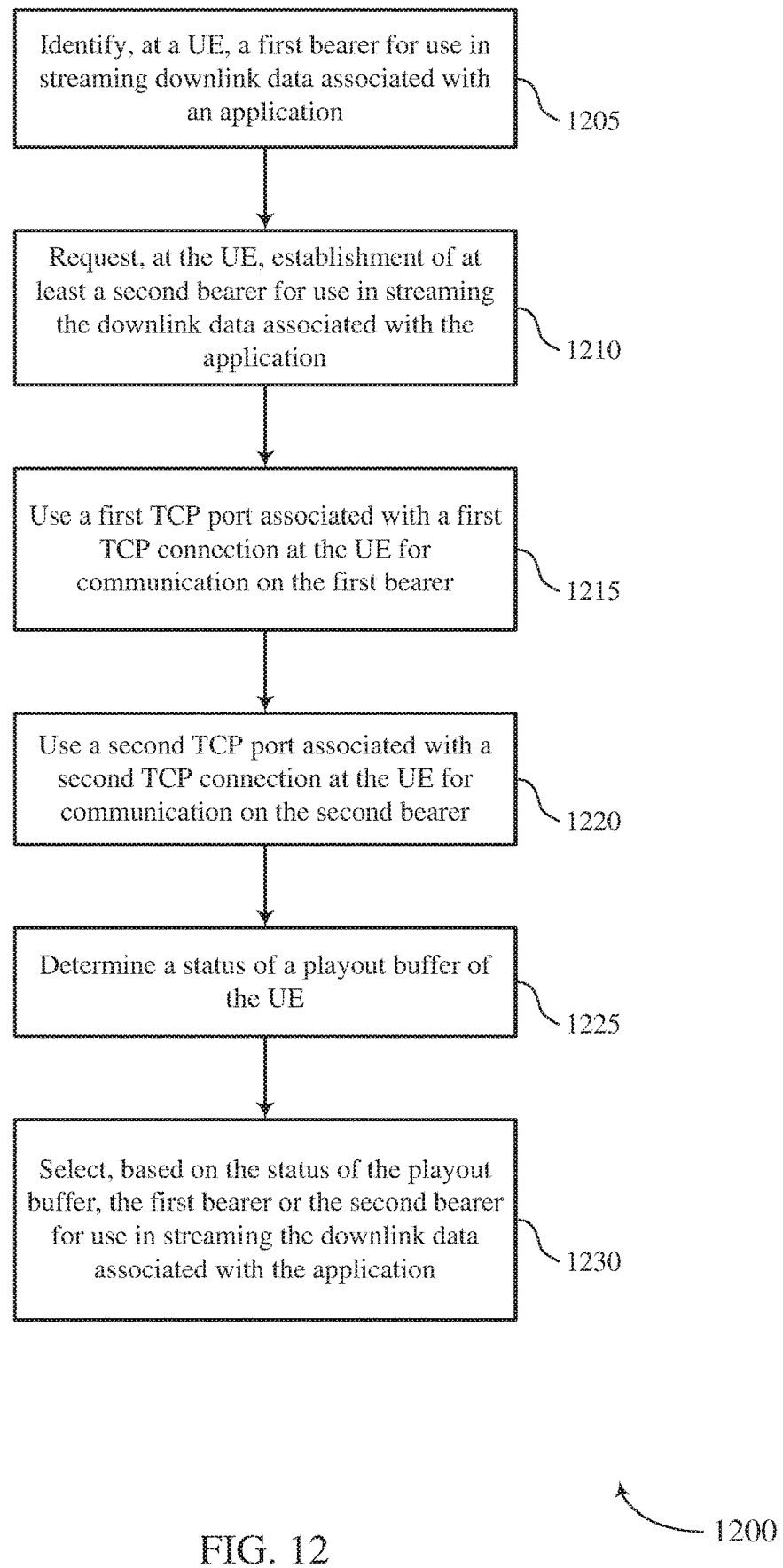

FIG. 12 shows a flowchart illustrating a method 1200 for dual bearer application data streaming in accordance with various aspects of the present disclosure. The operations of method 1200 may be implemented by a UE 115 or its components as described herein. For example, the operations of method 1200 may be performed by a data streaming manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify, at a user equipment (UE), a first bearer for use in streaming downlink data associated with an application. The operations of block 1205 may be performed according to the methods described with reference to FIGS. 1 through 6. In certain examples, aspects of the operations of block 1205 may be performed by a bearer identification component as described with reference to FIGS. 7 through 10.

At block 1210 the UE 115 may request, at the UE, establishment of at least a second bearer for use in streaming the downlink data associated with the application. The operations of block 1210 may be performed according to the methods described with reference to FIGS. 1 through 6. In certain examples, aspects of the operations of block 1210 may be performed by a bearer request component as described with reference to FIGS. 7 through 10.

At block 1215 the UE 115 may use a first TCP port associated with a first TCP connection at the UE for communication on the first bearer. The operations of block 1215 may be performed according to the methods described with reference to FIGS. 1 through 6. In certain examples, aspects of the operations of block 1215 may be performed by a TCP port component as described with reference to FIGS. 7 through 10.

At block 1220 the UE 115 may use a second TCP port associated with a second TCP connection at the UE for communication on the second bearer. The operations of block 1220 may be performed according to the methods described with reference to FIGS. 1 through 6. In certain examples, aspects of the operations of block 1220 may be performed by a TCP port component as described with reference to FIGS. 7 through 10.

At block 1225 the UE 115 may determine a status of a playout buffer of the UE. The operations of block 1225 may be performed according to the methods described with reference to FIGS. 1 through 6. In certain examples, aspects of the operations of block 1225 may be performed by a buffer component as described with reference to FIGS. 7 through 10.

At block 1230 the UE 115 may select, based at least in part on the status of the playout buffer, the first bearer or the second bearer for use in streaming the downlink data associated with the application. The operations of block 1230 may be performed according to the methods described with reference to FIGS. 1 through 6. In certain examples, aspects of the operations of block 1230 may be performed by a bearer selection component as described with reference to FIGS. 7 through 10.

Figure 13:
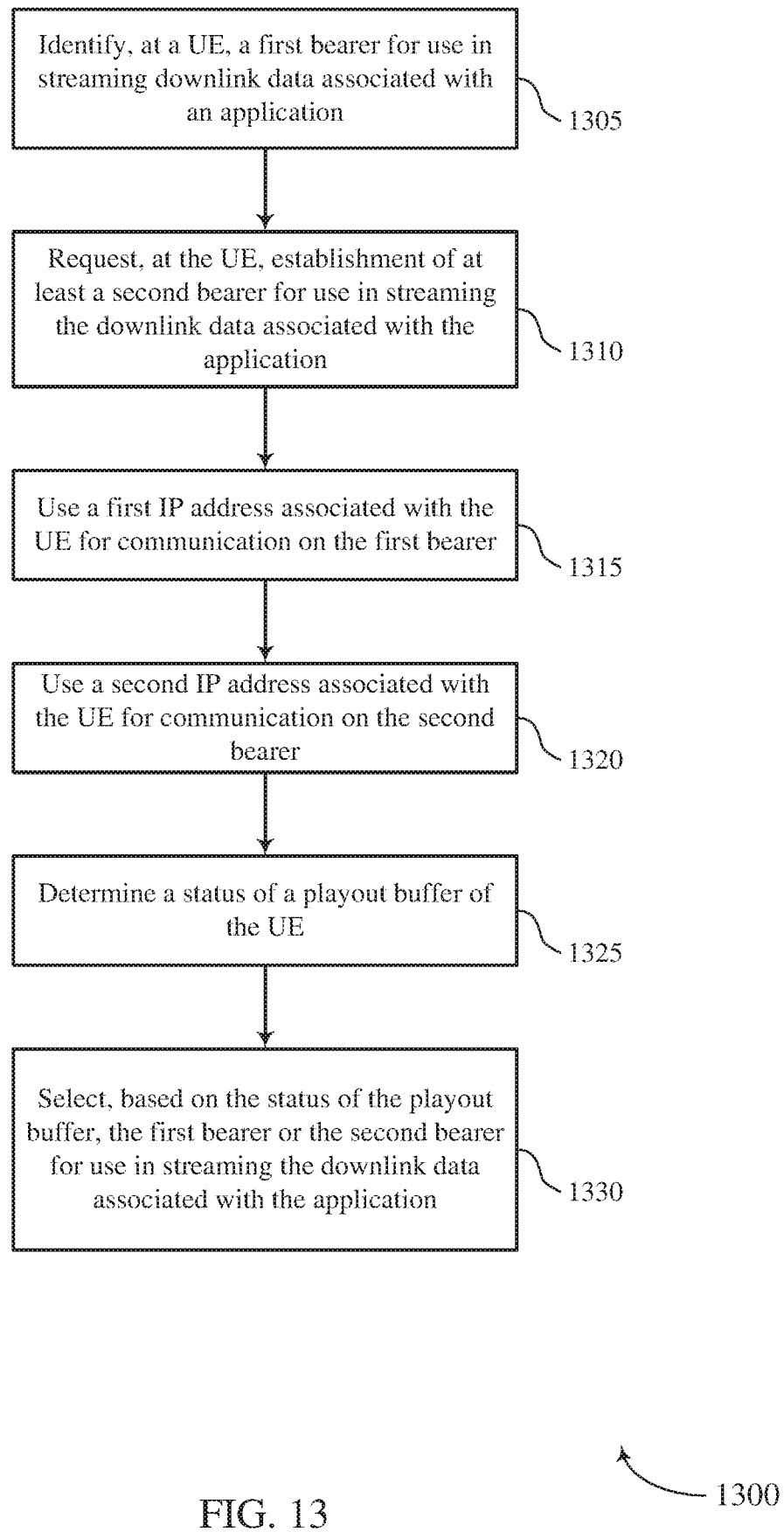

FIG. 13 shows a flowchart illustrating a method 1300 for dual bearer application data streaming in accordance with various aspects of the present disclosure. The operations of method 1300 may be implemented by a UE 115 or its components as described herein. For example, the operations of method 1300 may be performed by a data streaming manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify, at a UE, a first bearer for use in streaming downlink data associated with an application. The operations of block 1305 may be performed according to the methods described with reference to FIGS. 1 through 6. In certain examples, aspects of the operations of block 1305 may be performed by a bearer identification component as described with reference to FIGS. 7 through 10.

At block 1310 the UE 115 may request, at the UE, establishment of at least a second bearer for use in streaming the downlink data associated with the application. The operations of block 1310 may be performed according to the methods described with reference to FIGS. 1 through 6. In certain examples, aspects of the operations of block 1310 may be performed by a bearer request component as described with reference to FIGS. 7 through 10.

At block 1315 the UE 115 may use a first IP address associated with the UE for communication on the first bearer. The operations of block 1315 may be performed according to the methods described with reference to FIGS. 1 through 6. In certain examples, aspects of the operations of block 1315 may be performed by a IP address component as described with reference to FIGS. 7 through 10.

At block 1320 the UE 115 may use a second IP address associated with the UE for communication on the second bearer. The operations of block 1320 may be performed according to the methods described with reference to FIGS. 1 through 6. In certain examples, aspects of the operations of block 1320 may be performed by a IP address component as described with reference to FIGS. 7 through 10.

At block 1325 the UE 115 may determine a status of a playout buffer of the UE. The operations of block 1325 may be performed according to the methods described with reference to FIGS. 1 through 6. In certain examples, aspects of the operations of block 1325 may be performed by a buffer component as described with reference to FIGS. 7 through 10.

At block 1330 the UE 115 may select, based at least in part on the status of the playout buffer, the first bearer or the second bearer for use in streaming the downlink data associated with the application. The operations of block 1330 may be performed according to the methods described with reference to FIGS. 1 through 6. In certain examples, aspects of the operations of block 1330 may be performed by a bearer selection component as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS).

3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations (e.g., plural bearer application data streaming, etc.) without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, at a user equipment (UE), a first bearer for use in streaming downlink data associated with an application;
   requesting, at the UE, establishment of at least a second bearer for use in streaming the downlink data associated with the application;
   determining a status of a playout buffer of the UE; and
   selecting, based at least in part on the status of the playout buffer, the first bearer or the second bearer for use in streaming the downlink data associated with the application.

2. The method of claim 1, wherein selecting the first bearer or the second bearer comprises:
   selecting the first bearer based at least in part on an amount of data in the playout buffer satisfying a threshold; and
   selecting the second bearer based at least in part on the amount of data in the playout buffer not satisfying the threshold.

3. The method of claim 1, further comprising:
   using a first transmission control protocol (TCP) port associated with a first TCP connection at the UE for communication on the first bearer; and
   using a second TCP port associated with a second TCP connection at the UE for communication on the second bearer.

4. The method of claim 1, further comprising:
   using a first Internet protocol (IP) address associated with the UE for communication on the first bearer; and
   using a second IP address associated with the UE for communication on the second bearer.

5. The method of claim 1, wherein selecting the first bearer or the second bearer further comprises:
   selecting the first bearer or the second bearer based on a network or operator- imposed incentive.

6. The method of claim 1, wherein requesting establishment of at least the second bearer comprises:
   establishing a first transmission control protocol (TCP) connection using the first bearer;
   establishing a second TCP connection using the first bearer; and
   requesting, using one or more parameters of the second TCP connection, establishment of the second bearer.

7. The method of claim 6, wherein requesting establishment of the second bearer comprises:
   using an application programming interface (API) provided by at least one of a modem of the UE or a high level operating system (HLOS) of the UE to request establishment of the second bearer based at least on a traffic flow template (TFT) filter.

8. The method of claim 7, wherein:
   the TFT filter is based on a 5-tuple of the second TCP connection.

9. The method of claim 1, wherein requesting establishment of at least the second bearer comprises:
   initiating a first packet data network (PDN) connection and a second PDN connection via an application programming interface (API) provided by at least one of a modem of the UE or a high level operating system (HLOS) of the UE;
   establishing a first transmission control protocol (TCP) connection using the first PDN connection;
   establishing a second TCP connection using the second PDN connection; and
   requesting, using one or more parameters of the second TCP connection, establishment of the second bearer.

10. The method of claim 1, wherein selecting the first bearer or the second bearer comprises:
    determining that a high level operating system (HLOS) of the UE lacks support for dual Internet protocol (IP) bearer establishment;
    using a first IP address associated with the UE for communication on the first bearer; and using a second IP address associated with the UE for communication on the second bearer.

11. The method of claim 10, further comprising:
mapping a first transmission control protocol (TCP) port to the first IP address; and
mapping a second TCP port to the second IP address using network address translation (NAT).

12. The method of claim 1, wherein selecting the first bearer or the second bearer comprises:
determining that an amount of data in the playout buffer does not satisfy a threshold; and
sending a video request via a second transmission control protocol (TCP) connection over the second bearer, wherein the second bearer is a priority bearer.

13. The method of claim 1, wherein selecting the first bearer or the second bearer comprises:
determining that an amount of data in the playout buffer satisfies a threshold; and
sending a video request via a first transmission control protocol (TCP) connection over the first bearer, wherein the second bearer is a priority bearer having a priority that is greater than that of the first bearer.

14. The method of claim 1, wherein selecting the first bearer or the second bearer further comprises:
selecting the first bearer or the second bearer based on a monetary cost associated with use of the second bearer, a quota associated with use of the second bearer, or some combination thereof.

15. The method of claim 1, wherein:
the first bearer comprises a default bearer and the second bearer comprises a dedicated bearer having a priority that is greater than that of the default bearer.

16. The method of claim 1, wherein:
the downlink data associated with the application comprises video data, priority data, or some combination thereof.

17. The method of claim 1, further comprising:
requesting, at the UE, establishment of at least the second bearer for use in streaming the downlink data includes requesting, by an application client at the UE, establishment of at least the second bearer for use in streaming the downlink data.

18. The method of claim 1, wherein:
the first bearer and the second bearer each comprise at least one of a radio bearer, a core network bearer, or an evolved packet system (EPS) bearer.

19. The method of claim 1, wherein:
the first bearer comprises an evolved packet system (EPS) bearer;
the second bearer comprises an EPS bearer; and
an EPS bearer is a combination of a bearer between the UE and a base station, a bearer between the base station and a serving gateway, and a bearer between the serving gateway and a packet data network gateway.

20. An apparatus for wireless communication, comprising:
means for identifying, at a user equipment (UE), a first bearer for use in streaming downlink data associated with an application;
means for requesting, at the UE, establishment of at least a second bearer for use in streaming the downlink data associated with the application;
means for determining a status of a playout buffer of the UE; and
means for selecting, based at least in part on the status of the playout buffer, the first bearer or the second bearer for use in streaming the downlink data associated with the application.

21. An apparatus for wireless communication, in a system comprising:
a processor;
memory in electronic communication with the processor; and
one or more instructions stored in the memory and operable, when executed by the processor, to cause the apparatus to:
identify, at a user equipment (UE), a first bearer for use in streaming downlink data associated with an application;
request, at the UE, establishment of at least a second bearer for use in streaming the downlink data associated with the application;
determine a status of a playout buffer of the UE; and
select, based at least in part on the status of the playout buffer, the first bearer or the second bearer for use in streaming the downlink data associated with the application.

22. The apparatus of claim 21, wherein the one or more instructions operable to cause the apparatus to select the first bearer or the second bearer comprise one or more instructions operable to cause the apparatus to:
select the first bearer based at least in part on an amount of data in the playout buffer satisfying a threshold; and
select the second bearer based at least in part on the amount of data in the playout buffer not satisfying the threshold.

23. The apparatus of claim 21, wherein the one or more instructions are further executable by the processor to:
use a first Internet protocol (IP) address associated with the UE for communication on the first bearer; and
use a second IP address associated with the UE for communication on the second bearer.

24. The apparatus of claim 21, wherein the one or more instructions operable to cause the apparatus to request establishment of at least the second bearer comprise one or more instructions operable to cause the apparatus to:
establish a first transmission control protocol (TCP) connection using the first bearer;
establish a second TCP connection using the first bearer; and
request, using one or more parameters of the second TCP connection, establishment of the second bearer.

25. The apparatus of claim 24, wherein the one or more instructions operable to cause the apparatus to request establishment of the second bearer comprise one or more instructions operable to cause the apparatus to:
use an application programming interface (API) provided by at least one of a modem of the UE or a high level operating system (HLOS) of the UE to request establishment of the second bearer based at least on a traffic flow template (TFT) filter.

26. The apparatus of claim 21, wherein the one or more instructions operable to cause the apparatus to request establishment of at least the second bearer comprise one or more instructions operable to cause the apparatus to:
initiate a first packet data network (PDN) connection and a second PDN connection via an application programming interface (API) provided by at least one of a modem of the UE or a high level operating system (HLOS) of the UE;

establish a first transmission control protocol (TCP) connection using the first PDN connection;
establish a second TCP connection using the second PDN connection; and
request, using one or more parameters of the second TCP connection, establishment of the second bearer.

27. The apparatus of claim 21, wherein the one or more instructions operable to cause the apparatus to select the first bearer or the second bearer comprise one or more instructions operable to cause the apparatus to:
determine that a high level operating system (HLOS) of the UE lacks support for dual Internet protocol (IP) bearer establishment;
use a first IP address associated with the UE for communication on the first bearer; and
use a second IP address associated with the UE for communication on the second bearer.

28. The apparatus of claim 21, wherein the one or more instructions operable to cause the apparatus to select the first bearer or the second bearer comprise one or more instructions operable to cause the apparatus to:
determine that an amount of data in the playout buffer does not satisfy a threshold; and
send a video request via a second transmission control protocol (TCP) connection over the second bearer, wherein the second bearer is a priority bearer.

29. The apparatus of claim 21, wherein the one or more instructions operable to cause the apparatus to select the first bearer or the second bearer comprise one or more instructions operable to cause the apparatus to:
determine that an amount of data in the playout buffer satisfies a threshold; and
send a video request via a first transmission control protocol (TCP) connection over the first bearer, wherein the second bearer is a priority bearer having a priority that is greater than that of the first bearer.

30. A non-transitory computer readable medium storing code for wireless communication, the code comprising one or more instructions executable by a processor to:
identify, at a user equipment (UE), a first bearer for use in streaming downlink data associated with an application;
request, at the UE, establishment of at least a second bearer for use in streaming the downlink data associated with the application;
determine a status of a playout buffer of the UE; and
select, based at least in part on the status of the playout buffer, the first bearer or the second bearer for use in streaming the downlink data associated with the application.

* * * * *